US012747557B2

(12) United States Patent
Huissoon

(10) Patent No.: US 12,747,557 B2
(45) Date of Patent: Sep. 29, 2026

(54) ELECTRIC DRIVE OF MOBILE APPARATUS

(71) Applicant: Hudson Delta B.V., 's-Heer Arendskerke (NL)

(72) Inventor: Leendert Wilhelmus Cornelis Huissoon, s-Heer Arendskerke (NL)

(73) Assignee: HUDSON DELTA B.V., 'S-Heer Arendskerke (NL)

( * ) Notice: Subject to any disclaimer, the term of this patent is extended or adjusted under 35 U.S.C. 154(b) by 1011 days.

(21) Appl. No.: 17/801,459

(22) PCT Filed: Feb. 23, 2021

(86) PCT No.: PCT/NL2021/050122

§ 371 (c)(1),
(2) Date: Aug. 22, 2022

(87) PCT Pub. No.: WO2021/172984

PCT Pub. Date: Sep. 2, 2021

(65) Prior Publication Data

US 2023/0088161 A1 Mar. 23, 2023

(30) Foreign Application Priority Data

Feb. 24, 2020 (NL) ...................................... 2024981

(51) Int. Cl.
*E02F 3/32* (2006.01)
*B60K 11/06* (2006.01)
(Continued)

(52) U.S. Cl.
CPC .............. *E02F 3/325* (2013.01); *B60K 11/06* (2013.01); *E02F 3/301* (2013.01); *E02F 3/38* (2013.01);
(Continued)

(58) Field of Classification Search
CPC ... E02F 3/325; E02F 3/32; E02F 3/382; E02F 9/0808; E02F 9/16
See application file for complete search history.

(56) References Cited

U.S. PATENT DOCUMENTS 3,999,670 A * 12/1976 Weyhausen ............. E02F 3/307 37/379
4,143,778 A * 3/1979 Ullmann ................... E02F 9/16 414/694
(Continued)

FOREIGN PATENT DOCUMENTS

DE 4139379 A1 * 6/1993 ............. E04G 23/08
EP 0671511 A2 * 9/1995 ................ E02F 3/32
(Continued)

OTHER PUBLICATIONS

International Search Report and Written Opinion for the Application No. PCT/NL2021/050122, mailed Jul. 26, 2021, 17 pages.

*Primary Examiner* — Jamie L McGowan
(74) *Attorney, Agent, or Firm* — KDW Firm PLLC

(57) ABSTRACT

A mobile apparatus includes a main frame with displacing means, a rotating sub-frame rotatably connected to the main frame such that the sub-frame is rotatable around a rotation axis relative to the main frame, and a working arm connected to the sub-frame. The sub-frame includes a standing or seating position for an operator. The working arm includes at least two arm segments, and a first arm segment of the at least two arm segments is pivotally connected to the sub-frame around a pivot point located at a distance of the rotation axis. The first arm segment and the sub-frame are configured such that the first arm segment can be moved rearwards onto the sub-frame in the direction of the rotation axis to a rearward position in which the first segment extends over the rotation axis.

18 Claims, 21 Drawing Sheets

(51) Int. Cl.

| | |
|---|---|
| ***E02F 3/30*** | (2006.01) |
| ***E02F 3/38*** | (2006.01) |
| ***E02F 3/96*** | (2006.01) |
| ***E02F 9/08*** | (2006.01) |
| ***E02F 9/16*** | (2006.01) |
| ***E02F 9/20*** | (2006.01) |

(52) U.S. Cl.

CPC .............. *E02F 3/382* (2013.01); *E02F 3/964* (2013.01); *E02F 9/0808* (2013.01); *E02F 9/0866* (2013.01); *E02F 9/0883* (2013.01); *E02F 9/16* (2013.01); *E02F 9/2004* (2013.01)

(56) References Cited

U.S. PATENT DOCUMENTS

| | | | | | |
|---|---|---|---|---|---|
| 4,271,613 | A * | 6/1981 | Ferrero | E02F 3/302 | 414/722 |
| 4,579,182 | A * | 4/1986 | Dewing | B62D 11/20 | 180/9.46 |
| 4,728,251 | A * | 3/1988 | Takashima | E02F 3/32 | 414/694 |
| 4,797,060 | A * | 1/1989 | Kishi | E02F 3/32 | 414/742 |
| 5,106,256 | A * | 4/1992 | Murakami | E02F 9/166 | 280/166 |
| 5,108,253 | A * | 4/1992 | Kobayashi | E02F 9/2271 | 414/694 |
| 5,584,643 | A * | 12/1996 | Nishimura | E02F 3/302 | 414/685 |
| 5,661,917 | A * | 9/1997 | Marchetta | E02F 3/32 | 37/348 |
| 5,975,833 | A * | 11/1999 | Yamada | E02F 9/0833 | 212/300 |
| 6,019,569 | A * | 2/2000 | Sakuma | E02F 9/2275 | 414/722 |
| 6,199,307 | B1 * | 3/2001 | Kagoshima | E02F 3/325 | 60/420 |
| 6,266,901 | B1 * | 7/2001 | Kanda | B66F 9/065 | 37/403 |
| 6,640,915 | B2 * | 11/2003 | Haringer | B62D 55/04 | 180/9.26 |
| 6,729,831 | B1 * | 5/2004 | Kawamura | E02F 9/0808 | 414/694 |
| 6,772,544 | B2 * | 8/2004 | Takemura | E02F 9/0841 | 37/347 |
| 6,886,277 | B2 * | 5/2005 | Yukawa | E02F 9/2275 | 37/347 |
| 7,168,191 | B2 * | 1/2007 | Chikaishi | E02F 9/163 | 37/466 |
| D594,883 | S * | 6/2009 | Ikeda | D15/25 | |
| 9,181,675 | B2 * | 11/2015 | Ueki | E02F 9/0858 | |
| 10,036,136 | B2 * | 7/2018 | Higuchi | E02F 3/325 | |
| 11,313,101 | B2 * | 4/2022 | Umizaki | E02F 9/0891 | |
| 2006/0230650 | A1 * | 10/2006 | Murakami | E02F 9/0875 | 37/466 |
| 2013/0149095 | A1 * | 6/2013 | Huissoon | E02F 3/325 | 180/53.1 |
| 2013/0306388 | A1 * | 11/2013 | Yamamoto | E02F 9/16 | 180/89.12 |
| 2015/0101878 | A1 * | 4/2015 | Huissoon | E02F 9/0891 | 180/69.21 |
| 2015/0259873 | A1 * | 9/2015 | Rosec | E02F 9/085 | 414/687 |
| 2016/0122971 | A1 * | 5/2016 | Lyle | E02F 9/166 | 414/687 |
| 2016/0122972 | A1 * | 5/2016 | Price | E02F 3/325 | 180/312 |
| 2016/0122973 | A1 * | 5/2016 | Lyle | E02F 3/301 | 414/687 |
| 2016/0319513 | A1 * | 11/2016 | Chen | E02F 9/024 | |
| 2018/0058033 | A1 * | 3/2018 | Higuchi | E02F 9/16 | |
| 2018/0238022 | A1 * | 8/2018 | Kurosaka | B60K 11/04 | |
| 2023/0088161 | A1 * | 3/2023 | Huissoon | E02F 3/3405 | 37/410 |
| 2023/0183941 | A1 * | 6/2023 | Smith | E02F 9/085 | 414/687 |
| 2024/0018748 | A1 * | 1/2024 | Okazaki | E02F 9/0866 | |
| 2024/0093463 | A1 * | 3/2024 | Sakisaka | E02F 3/325 | |
| 2024/0229422 | A1 * | 7/2024 | Wakata | E02F 9/16 | |
| 2025/0146256 | A1 * | 5/2025 | Minematsu | E02F 9/22 | |
| 2025/0163683 | A1 * | 5/2025 | Sai | E02F 9/265 | |

FOREIGN PATENT DOCUMENTS

| | | | | |
|---|---|---|---|---|
| JP | S63272820 | A * | 11/1988 | |
| JP | 2006037393 | A * | 2/2006 | |
| WO | WO-9532340 | A1 * | 11/1995 | E02F 9/163 |
| WO | WO-9902789 | A1 * | 1/1999 | E02F 3/966 |
| WO | WO-0012826 | A1 * | 3/2000 | E02F 3/301 |
| WO | 2011152709 | A2 | 12/2011 | |
| WO | WO-2021172984 | A1 * | 9/2021 | E02F 3/325 |

* cited by examiner

ELECTRIC DRIVE OF MOBILE APPARATUS

This application is a national stage filing under 35 U.S.C. 371 of pending International Application No. PCT/NL2021/050122, filed Feb. 23, 2021, which claims priority to Netherlands Patent Application No. 2024981, filed Feb. 24, 2020, the entirety of which applications are incorporated by reference herein.

FIELD OF THE INVENTION

The present invention relates to a mobile apparatus with an operating arm, such as for instance wheel loaders, front loaders on tractors, tracked loaders, skid-steers, excavators, backhoe loaders, cranes, mobile manipulators and mobile robots or combinations thereof. The invention relates more specifically to a mobile apparatus comprising a main frame, a rotating sub-frame an operating arm connected to the sub-frame, drive means configured to drive displacing means of the mobile apparatus, such as one or more wheels and/or one or more caterpillar tracks and energy storage with a specific topology and packaging design for both the main and sub-frame.

BACKGROUND

Excavators are known which have a main frame or a rotatable sub-frame with motors and energy storage in usually single box type shapes at specific dedicated areas in the rotatable sub-frame. Wheel loaders and skid steer loaders are known with also a box type energy storage compartment in the rear of the vehicle. Robots with high lifting capacity, such as over 500 kg, are working indoors with external power supply and energy storage.

SUMMARY

Preferred embodiments of the invention are described in the claims.

The present invention is distinguished from the prior art (also the prior art of the inventor) in that it realizes an energy-efficient, highly manoeuvrable versatile mobile apparatus with high lifting capacity, on-board energy storage and with an inventive topology of both the sub-frame and main frame. This object is achieved, among others, by a mobile apparatus as according to claim 1 wherein the main frame with displacing means has a rotating sub-frame with working arm on the sub-frame of which the first arm segment of the working arm can be moved rearwards onto the sub-frame and over the rotation point between the main frame and the sub frame and with a seating or standing position next to or in between components of the sub-frame. In the most rearward position of the first arm segment the legs and/or feet of the operator can be next to the first arm segment.

The invention also distinguishes from prior art in that the rotating sub-frame can be locked to a lower part of the first arm segment, one of which the first arm segment is part of an arm with at least two arm segments. This enables a fixed rearward position of the first arm segment to allow for a very stable and compact structure through a connection with the sub-frame, possibly through a vertical rotating kingpost between the sub-frame and the first arm segment. The advantage of this locking solution is that the high load forces on the first arm segment can flow directly in the strong mechanical structure of the sub-frame in the area above the slew bearing between the sub-frame and the main frame. The locking means can be engaged manually, mechanically, electrically, electronically in a pneumatic or hydraulic way or a combination. Preferred is a solution without play that can be engaged in a safe position for the operator such as standing next to the mobile apparatus when controlling one or 2 buttons or switches or other means so that the locking takes place when the operator is not in the vicinity of the working arm. This principle can also be used for moving the first arm segment in a new position or the most rearward position, after which in the same sequence the locking takes place. This of course can be vice versa. Additionally this can be coupled to a seat or position sensor such that when the operator is in the mobile apparatus or sitting on a seat, it prevents the movement of the first arm segment to and away from its most rearward position.

It is particularly advantageous for the invention to incorporate a recess in the sub-frame to allow the displacement means such as tires or caterpillar tracks to steer at a very sharp angle, at least more than 45 degrees and preferably more than 60 degrees. Such recess is required on both sides of the tapered or curved shape of the sub-frame of which the sub-frame partly flows over displacement means. Such a tapered or curved shape is also preferred for the optional kingpost between the sub-frame and the first arm segment. This enables a very low positioned sub-frame on top and in between parts of the main frame. In between the two recesses the mounting structure or plate for the main valve is positioned.

The mechanical structure of the sub-frame is new and inventive in that horizontal and vertical plane members have a double function. First these elements carry the structural loads. Secondly they divide the sub-frame in compartments for various different components. Third function is that they divide and guide air flow for cooling and heating of components like valves, electric motors, controllers, electronics, inverters, converters, batteries, capacitors, hydrogen fuel cells, fans, cables, wires, hoses, conduits and other components such as for thermal management.

It is moreover advantageous to have a left and right energy storage area at the rear side of the sub-frame. The energy storage components can be batteries, capacitors, a fluid or a gas such as hydrogen. When a seat is comprised, the seat can be in between these compartments. Under the seat additional energy storage components can be positioned. At the lower front area of the sub-frame a hydraulic valve can be situated in one of the more centralized compartments. It allows air to flow to side compartments and also to the front and rear centralized compartments.

Each of the compartments can have a cooling system or air flowing. One or multiple fans can be used for cooling one or more compartments and components inside. The fans can be coupled to a controller and sensors such that the sensor controls the air speed and volume. At low ambient temperatures the air volume can be low or not at all and at high ambient temperatures the air volume and speed can be high to transfer the heat from the components. It is possible to have the air entering at the bottom of the sub-frame or halfway the sub-frame, optionally through filters, going through different compartments higher up and exiting at the rear of the sub-frame. A reverse direction is also possible. It can have one fan in the centre for all compartments or multiple fans for different compartments. In a preferred embodiment the left, middle and right compartment each have a separate fan with control and sensor system. The location of a fan can be in the front of the sub-frame, in the middle or in the rear of the sub-frame A fan can have air spoilers to guide the air to and from different components and areas in a compartment. Air flaps can also be installed to divide the air between compartments or to shut off air flowing to allow heat to build up inside the compartments when ambient temperatures are low. An air conditioning system, with components such as compressor, condenser, evaporator, valves, and/or chiller can also be installed. This allows for an air-cooling system by which cooled air is used as a cooling medium for the mentioned components. It is also possible that it allows for a liquid thermal system in order to cool or even heat the energy storage and other electric components. The air cooling or liquid cooling can be controlled when the mobile apparatus is working, when energy storage devices are being charged or in advance of charging. It should be noted that both electrically powered heat from components can be used, as well as hydraulically powered heat can be used to increase the temperature of the various mentioned components.

The sub-frame can also comprise one or two areas on the left and right rear outside. These can house additional energy storage units such as batteries, capacitors, gaseous or liquid fuel such as hydrogen. The areas can also incorporate fluid tanks such as a coolant or hydraulic oil. It is advantageous to have one fluid tank positioned at the rear side part of the sub-frame and on the outer side of an energy storage compartment. This way the temperature of the hydraulic oil does not directly influence the temperature of the adjacent compartments. As the tank is on the outside of the sub-frame it can dissipate heat to the ambient world and therefore cool the fluid inside. One of the preferred embodiments is to have two tanks, both on the rear left and right sides of the sub-frame of which the tanks are connected. In between the connecting hose or conduit a radiator and cooling fan can work to cool the fluid. This way one tank and its fluid has a lower temperature that the other. The lowest temperature tank is preferred to be at the side of the sub-frame at which the operator is mostly likely to enter. It can be on the left or right side. The possible materials of the tank can be plastic, steel or aluminium or any other material to transfer heat to ambient. To protect the one or more tanks, a strong structural member such as a profile runs from half way of the sub-frame to the rear and connects with the structural members of the sub-frame and the cabin or tipping over protective structural members. The mentioned cooling fan for the fluid or hydraulic oil can be the same cooling fan for the air cooling or can be the same fan for a liquid cooling system for electric components. Another possible embodiment is a spare tire at the rear of the sub-frame, which spare tire has enough opening in the rim centre to allow the passage of air flow to and from at least one cooling fan.

A further embodiment of the sub-frame can be that one or more operating instruments such as joysticks or one or more buttons or one or more touch screens or one or more steering wheels are connected to a movable structure. The structure itself can be swivelled, rotated, folded or slides away or a combination to allow the entrance for the operator. This inventive solution reduces components and makes sure that the operator always closes the structure to the sub-frame whilst operating the mobile apparatus. The structure can swivel, rotate, fold or slide in various ways such as vertical or diagonal or horizontal or a combination, however, in a preferred embodiment the movable structure with operating instruments connects or locks at both the front and rear parts of the cabin or other protective structure. The movable structure in this way can also serve as a safety means for the operator during a collision or tipping over. It can incorporate an armrest and/or an arm or shoulder pad. A sensor can detect the position of the structure and therefore allow the operating instruments to be active or inactive. The active position is when the structure is locked into the operating position. It is a much more integrated solution compared to the prior art. The structure can comprise a steering wheel out of the middle of the seat or standing position or can have the steering wheel in the centreline of the seat or standing position. Another embodiment is that the sub-frame has a swivelling, rotating or folding structure on the left and also on the right side. This allows entrance of the operator on both sides. The one or more movable structure can hold or be attached to a door or window from a material such as glass, plastic, steel or other material or combination.

The entrance of the operator is solved by a geometrical profile solution of the sub-frame structure, which is low at the front side and high at the rear in a view from the side. The profile connects to a vertical plate structure of the sub-frame, which is also a plate structure for one of the outer compartments of the sub-frame. The profile itself can serve as a tip over and roll over protective structure and/or falling object protective structure. It can have hollow profiles running from the forward part of the sub-frame to the rear part of the sub-frame. Hollow profile cross members can connect a left and right side.

It is advantageous to use the volume of the inside of these structural members for cooling and heating purposes. Hydraulic oil or cooling fluid can run through these profiles to dissipate heat from the fluid to the profiles and connecting plates, such as a sun roof or protective or structural plate. A pump and/or valve can control the speed of the fluid. These can for instance be the hydraulic valves for the operating arm or an attachment, which can be placed in the lower centre of the sub-frame. This inventive solution saves space and energy, as no or limited heat exchange components are required. The profiles are directly adjacent to potential windows and doors. This enables to heat these areas to avoid condensation in the winter and low ambient temperatures and can provide indirect heat to the operator. The sub-frame can have embodiments without a cab structure and without a seating or standing position for an operator. This is intended for autonomous or remote operations.

The sub-frame can have an electrical connection for charging or a connection for fuelling a liquid or a gas such as hydrogen.

According to a one of the further preferred embodiments, the sub-frame rotates on a main frame with displacing means, of which the main frame has a low middle section and a higher front and rear section. One of the higher seconds can house one or more motors and controllers or inverters for the displacing means. Another higher section of the main frame can be the connection to an axle or an oscillating or suspension structure for displacing means. A higher section of the main frame on the left or right sides can be to house energy storage or electronic components such as batteries, capacitors, hydrogen, fuel cells, controllers, inverters and converters. Openings in the main frame and cooling components such as fans, air and liquid cooling loops are possible.

The shape of the main frame in plan (top or bottom) view is such that it has a large recess left and large recess right for the steerable displacement means such as tires or caterpillar tracks. This inventive solution requires a strong, high stressed structural zone against torsion. Therefore it has cross section bulkhead members.

The mechanical load bearing structure of the main frame can be a combination of outer plates or plane members and inner plane structural members plates. The inner structure can be oriented from the slew bearing and towards the higher front, rear and side portions of the main frame. The narrow passage from the centre to the load bearing structure of the steerable displacement means starts low and ends high.

The displacement means can be oscillating or even suspended and dampened. Therefore the structural members in between the steerable wheels or caterpillar tracks are high and can possibly incorporate one or more steering actuators, tie-rods and an oscillation swivel point. The swivelling can be blocked through a mechanical, electric, electronic, pneumatic, hydraulic or combination device as such that it prevents the rotation between the displacement means and the main frame.

Embodiments with hydro-pneumatic suspension are also possible. This can be through the suspension and damping of the complete axles structure or through the suspension and damping of each left and right displacement means.

The steering mechanism can incorporate an Ackermann steering principle, by which the tie-rods are diagonally aligned from a central swivel point with actuator to reach the very steep steering angles.

In both the main frame and the sub-frame volatile components such as energy storage in the form of batteries, capacitors, electronics, liquid fuel, gaseous fuel, hydrogen fuel cells, engines and so on can be suspended and dampened. An embodiment is a structure with the components inside on which each lower corner of the structure a suspension and/or dampening unit is connected. This can be either with a vertical, horizontal, diagonal orientation in 2d or 3d plane. This can work well for low volumetric/box shapes. For high volumetric/box shapes embodiments are possible with both low and high mounted suspension and damping units. The suspension and damping units can for instance be springs, rubber-mounts, plastic-mounts, gas type dampers, hydro-pneumatic dampers or combinations. The low or high volumetric structures can be positioned outside a compartment or inside a compartment.

The main frame can connect to an implement such as a blade or snowblade. This blade can be fixed in vertical and horizontal position to the main frame. On or in the blade one or two actuators can move a stabilizer to realize a left and right wide table platform for lifting and excavation work. It is particularly advantageous to stabilize the mobile apparatus on uneven terrain in such that the left and right actuators can be positioned at different height compared to the main frame. At the same time it is possible to adjust and block the oscillating or suspended displacement means on the opposite side of the blade so that the complete mobile apparatus can be levelled in a 360 degree rotation.

There can be different embodiments of one or more control system for the described solutions. For instance a Can-Bus system of different protocols such as J1939, Flex Ray, Isobus or other types such as be a glass fibre system.

The above stated and other advantageous features and objects of the invention will become more apparent, and the invention better understood, on the basis of the following detailed description when read in combination with the accompanying drawings, in which:

FIG. 1 shows a mobile apparatus 1000 provided with main frame 1 on which displacement means 4 in the form of four caterpillar tracks are arranged. A location 6 for the driver in the form of a cab is arranged on main frame 1. Of the operating arm 100, the first arm section 1010 is in its most rear position. Optional kingpost 20 with vertical rotation of the working arm on the sub-frame is visible. In this figure, the mobile apparatus is depicted on uneven ground.

FIG. 1A shows a schematic view of an embodiment of the invention.

FIG. 2 shows an embodiment with two caterpillar tracks. It can be seen that components in the main frame are accessible from the side and in between one of the caterpillar tracks. The first arm section 201 is in its most rearward position. The third arm section 203 is in the position to assist the movement of the first arm section 201 forward because of the mass and centre of gravity of the third arm section helping the actuator of the first boom section. Pin or shaft 112 is visible at the front.

FIG. 3 shows an embodiment with a blade 120 with opening 123 and connected to that blade a stabilizer 121 actuated by actuator 122. The second 202 and third 203 arm sections with their mass and their centres of gravity are depicted to assist the movement of arm section 201 forward.

FIG. 4 shows a side view of an embodiment of the sub-frame 2 with structural member 22 and directly connected to these part of locking mechanism 23 and a movable part 24 of the locking mechanism, allowing the movement and rotation over swivel point 211 of first arm section 201 and directly connected to the arm section a mechanical part 212. Structural plate 21 of the sub-frame is visible below the locking means, as well as the centre of rotation 23 between the main frame and the sub-frame.

FIG. 5 shows the same side view with part of locking mechanism 24 moved to block the rotation of arm segment 201.

FIG. 6 shows the sub-frame 2 with a valve component 25 in the centreline of the sub-frame. In structural sub-frame plate 21 openings 21' are shown, which allow to components such as an electric motor and/or pump 42. The protective structure 26 for the sub-frame and the hydraulic or fluid tank 27 is visible on the right side. Also on the right the diagonal upwards running structural member for good entrance is depicted, as well as a swivel and attachment point for a structural member whereon a joystick can be mounted. On the left side an opening for air 28 and location for a filter and/or cover 29 also shows an electronic component 41 in the possible cool air stream. Seat 70 is also shown.

FIG. 7 shows the bottom side of the sub-frame 2 with the mounting area of a slew bearing between the main frame and the sub-frame. In the diagonal upward running sub-frame, the recesses 22 for the moving and sharp steering displacement means of the main frame can be seen and in between them the mounting plane/plate for a valve component. At the rear of the sub-frame a cooling fan 50 or radiator is visible. The structural profile members 33 can be seen. Also illustrated with 34 are the fluid directions of a coolant, hydraulic oil or other fluid within the structural or protective profiles 33.

FIG. 8 shows a rear side view of the sub-frame 2 on which structural members/planes/plates 32 are visible. These form compartments for technical components 40 such as energy storage or electrical or electronic components.

FIG. 9 shows protective structure 33. Operating instrument in the form of a joystick 60 is connected to movable structural member 64. On this an armrest 61 is mounted and a locking system 62 to connect between the movable structural member 64 with protective structure 33. On the lower side through the sub-frame an air stream 51 is visible, which flows through different compartments and alongside technical component 43.

FIG. 10 illustrates sub-frame 2 where many structural planes/plates can be seen and openings 28 in between the compartments. Air stream 51 can be seen to flow in or out opening 28 through a compartment on one of the sides of the sub-frame. On the lower part technical component such as an electric motor and/or pump is visible.

FIG. 11A depicts a cross section of the sub-frame at the area of a potential seat 70. Structural plates and members 32 throughout can be seen. Technical or energy storage components 40 with cooling devices or plates 41 are here depicted with in between a seat 70. The outside areas 27 can comprise of additional energy storage components or compartments. These can also hold hydraulic, coolant or any other fluid. On the left side inside profile 31 the potential flow or a fluid inside the profile is pointed at.

FIG. 11-B shows combined technical components suspended/dampened on the lower side.

FIG. 11-C shows separated suspended/dampened technical components with space in between FIG. 11-D shows a 3 dimensional view of a technical component suspended in all directions FIG. 12 illustrates a potential transparent door and possible locations 80 and 81 for operating instruments to engage and control the movement of the first arm segment from and to the most rearward position, as well as to control the locking of the arm segment to the sub-frame. These possible locations 80 and 81 for double hand control can only be used when the operator is outside the mobile apparatus.

Figure 1:
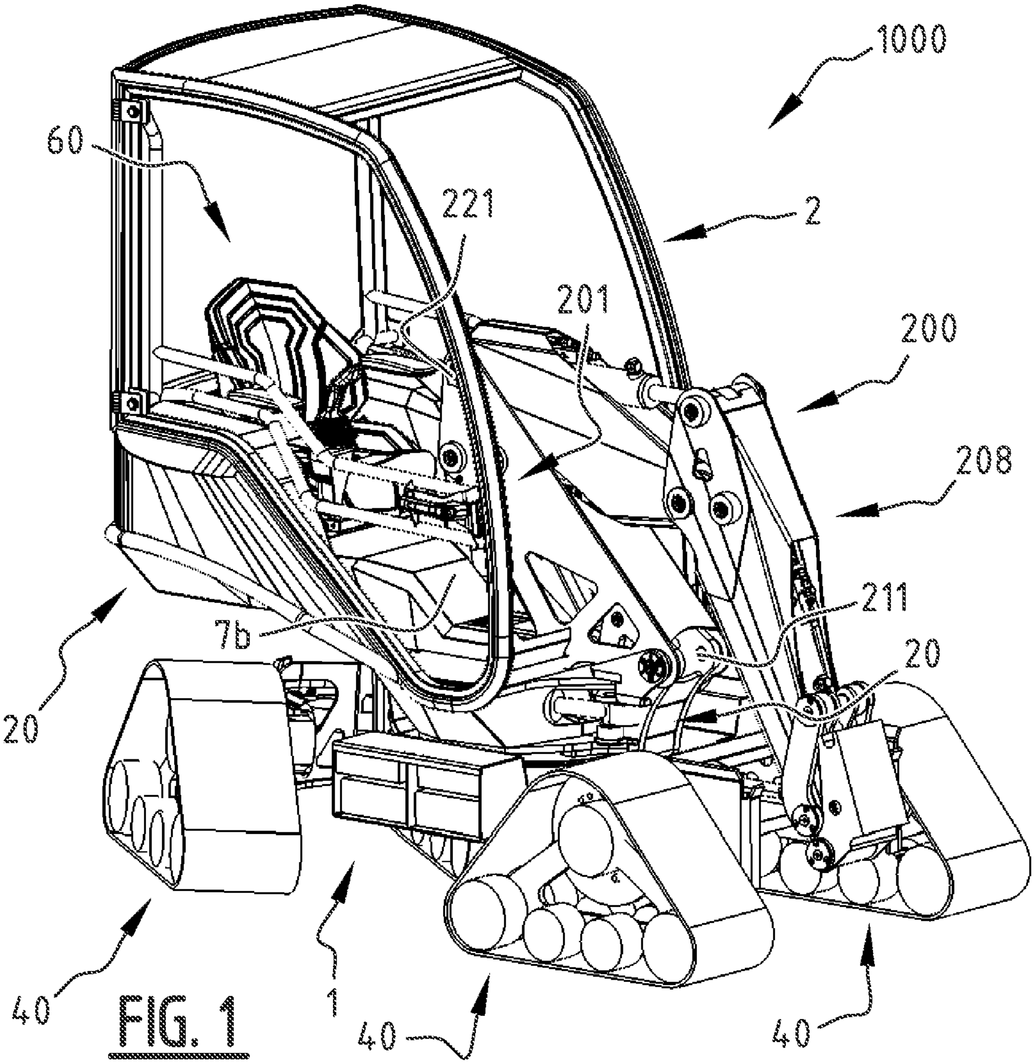
Figure 1A:
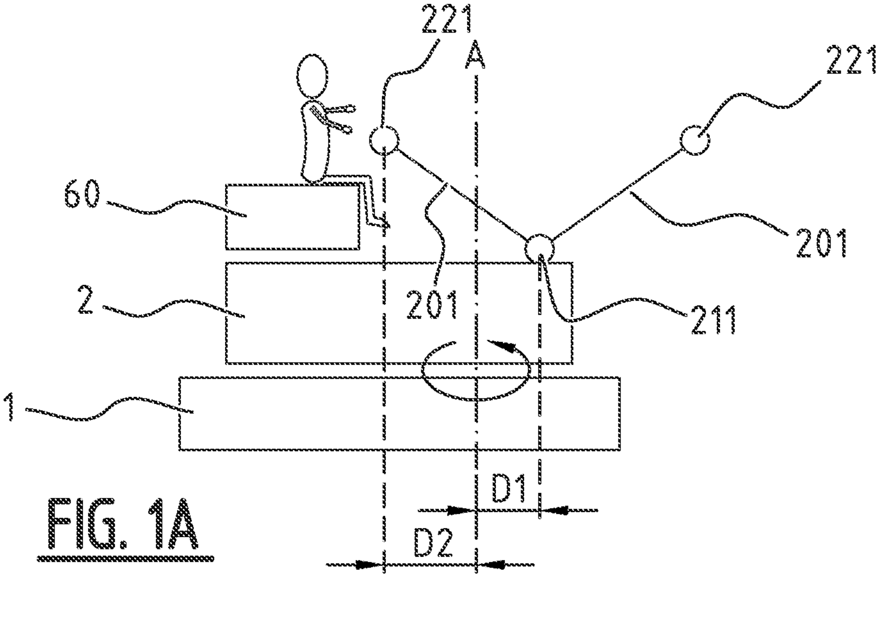
Figure 2:
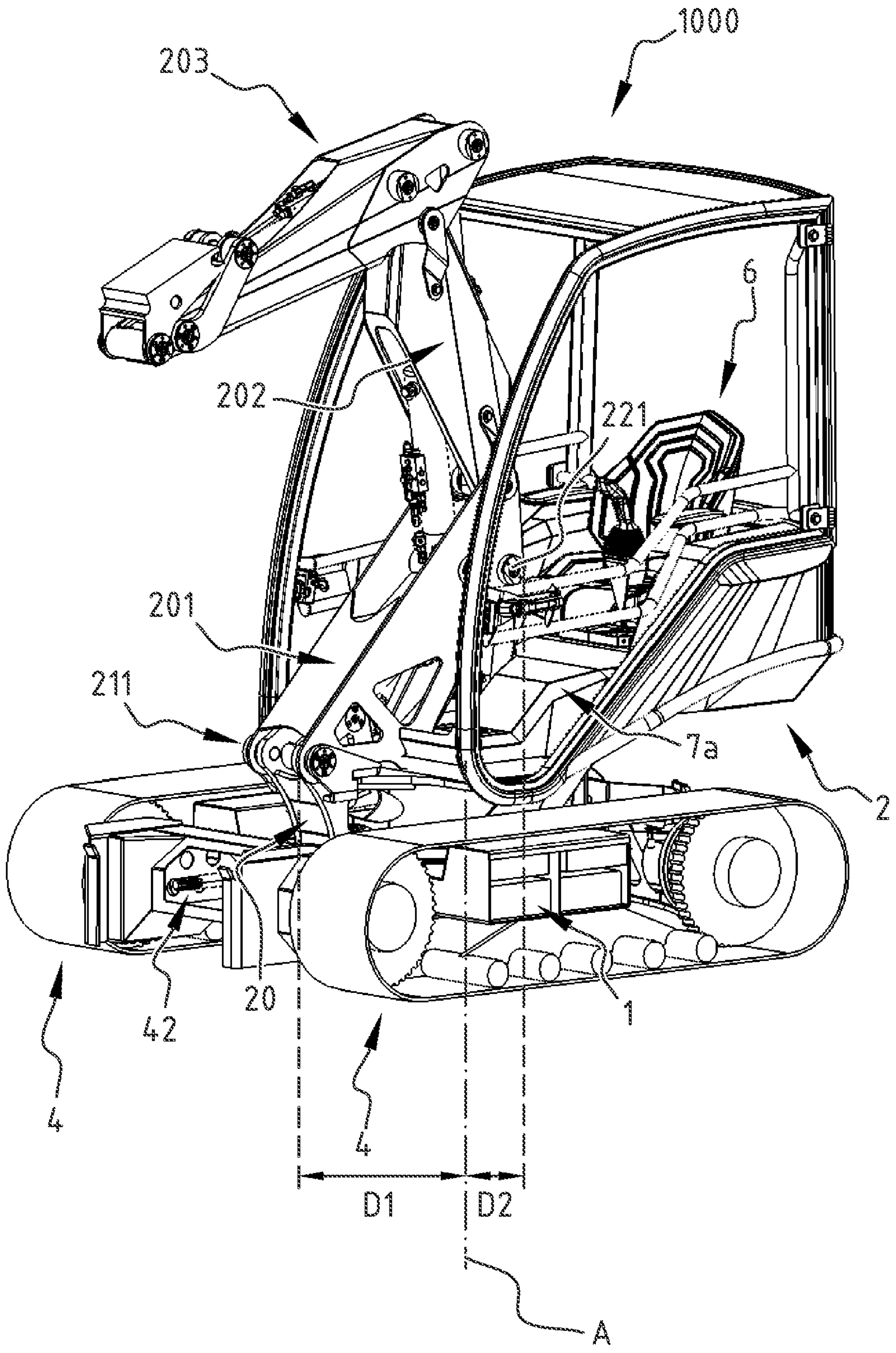
Figure 3:
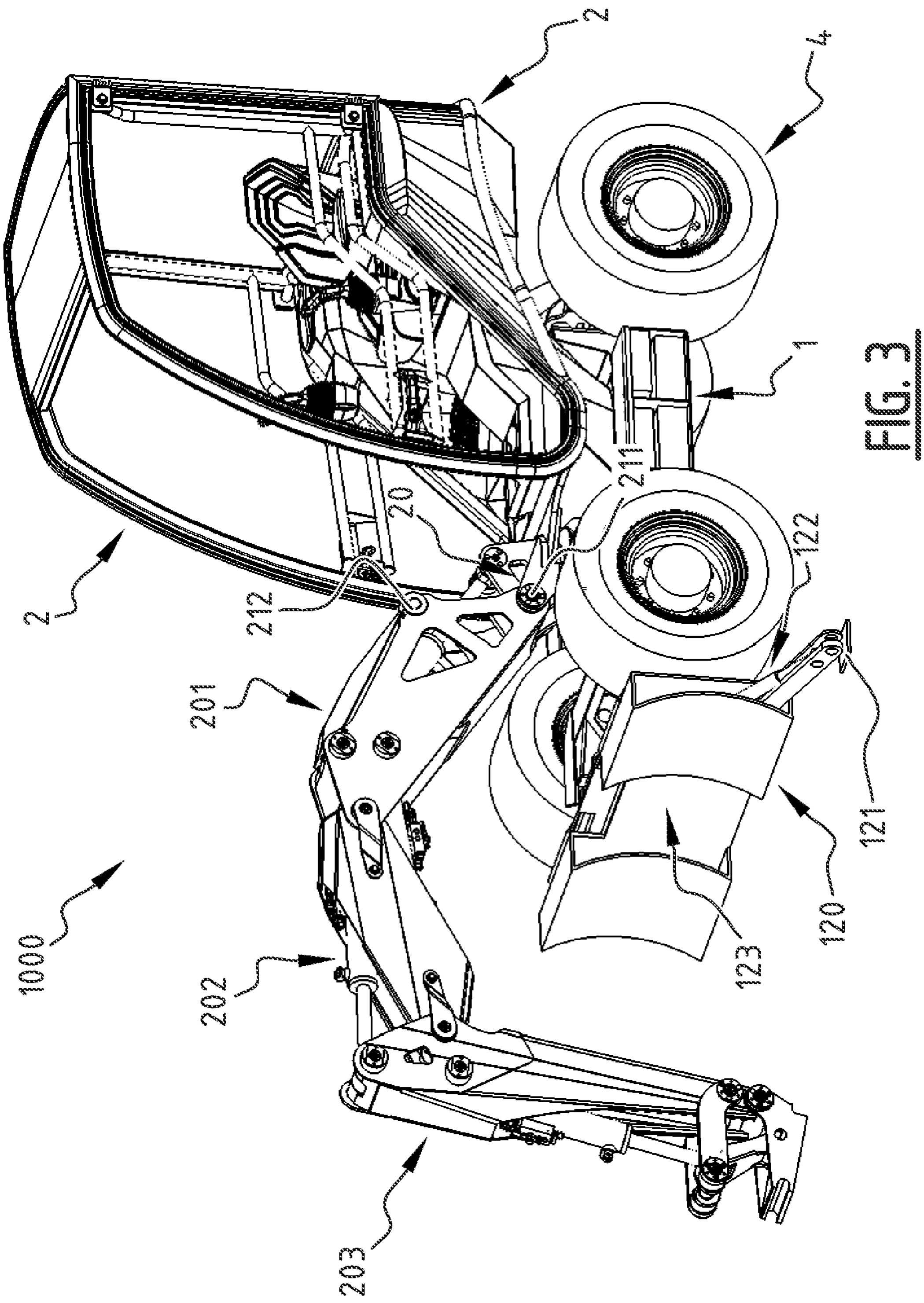
Figure 4:
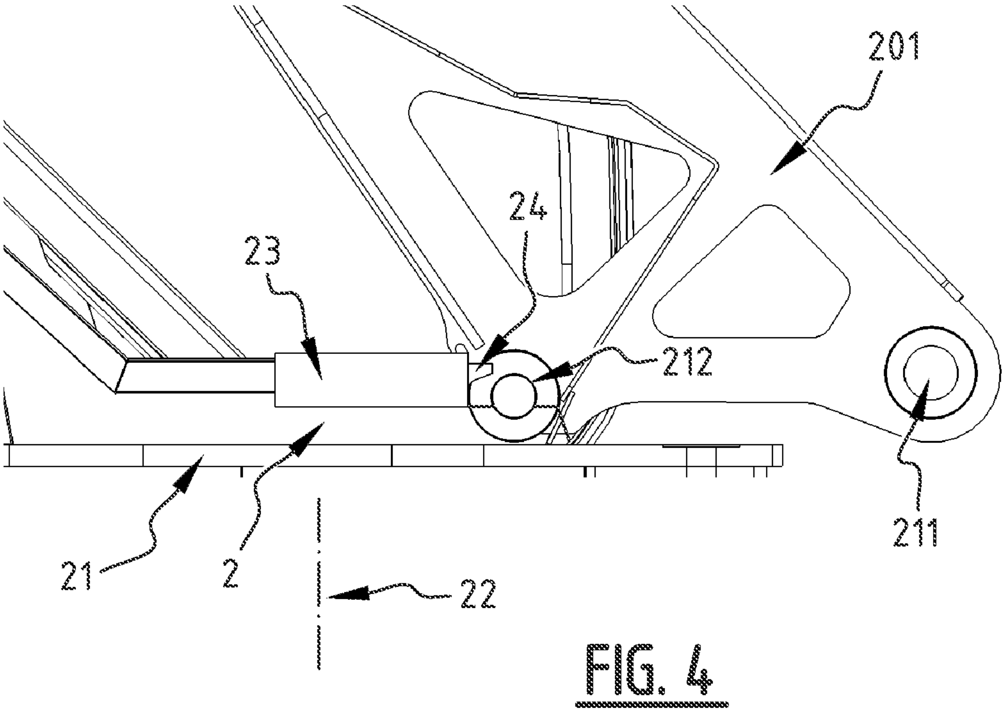
Figure 5:
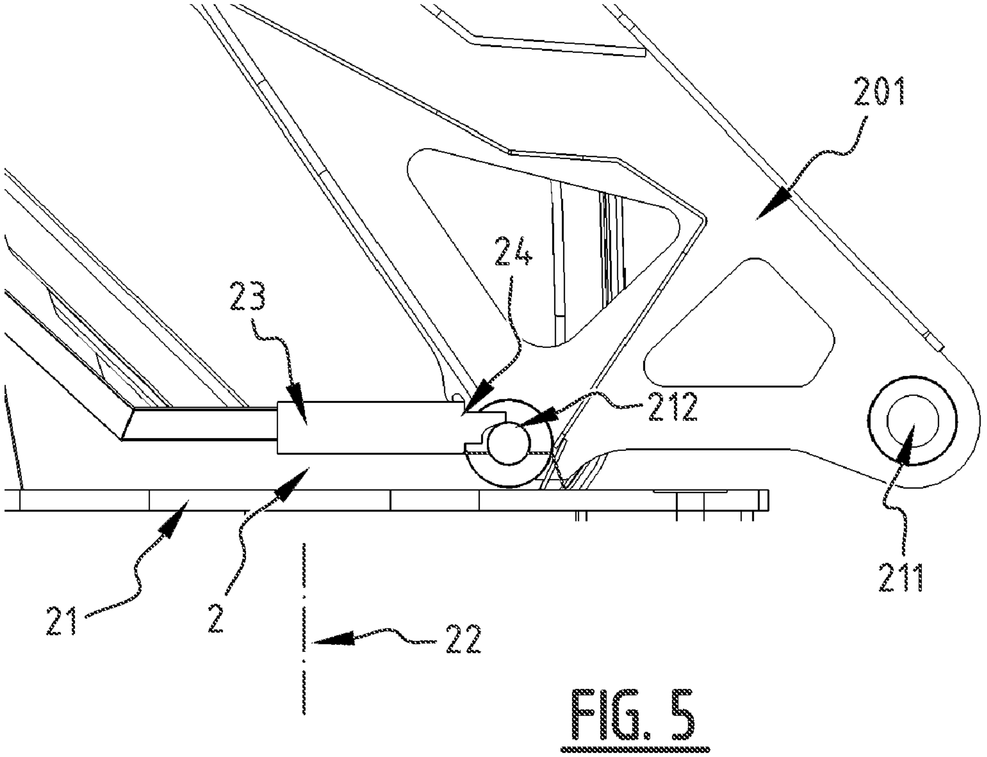
Figure 6:
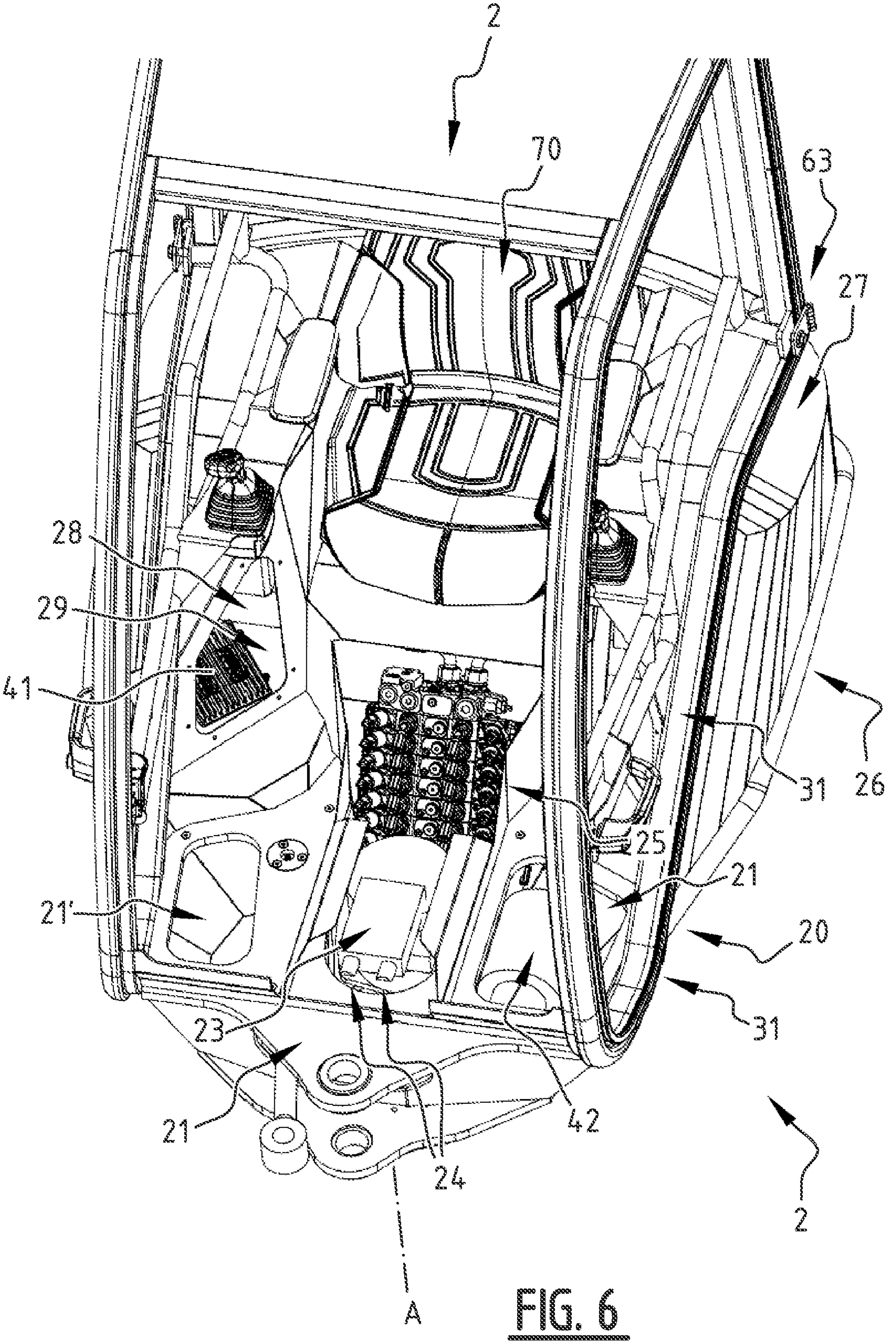
Figure 7:
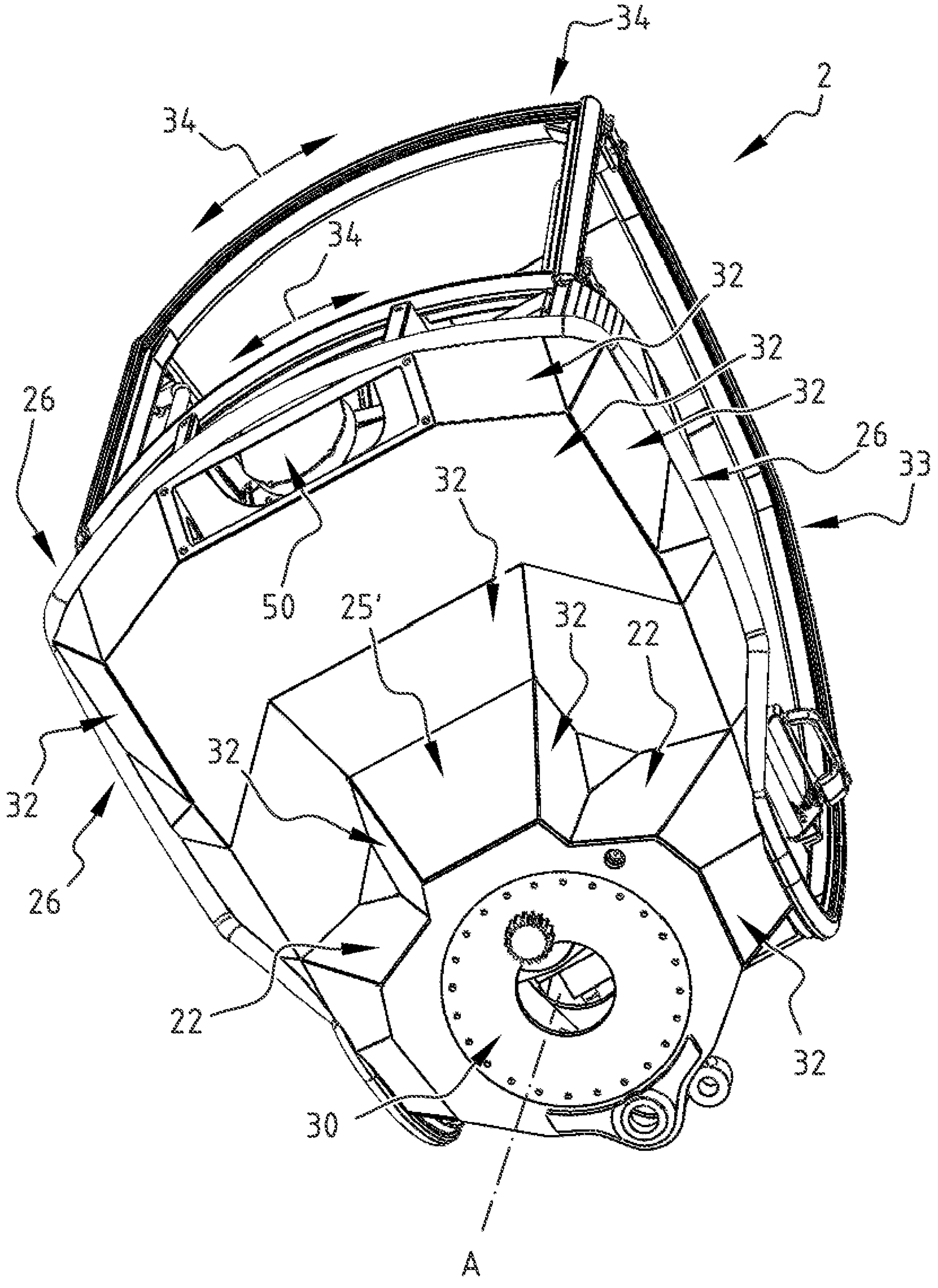
Figure 8:
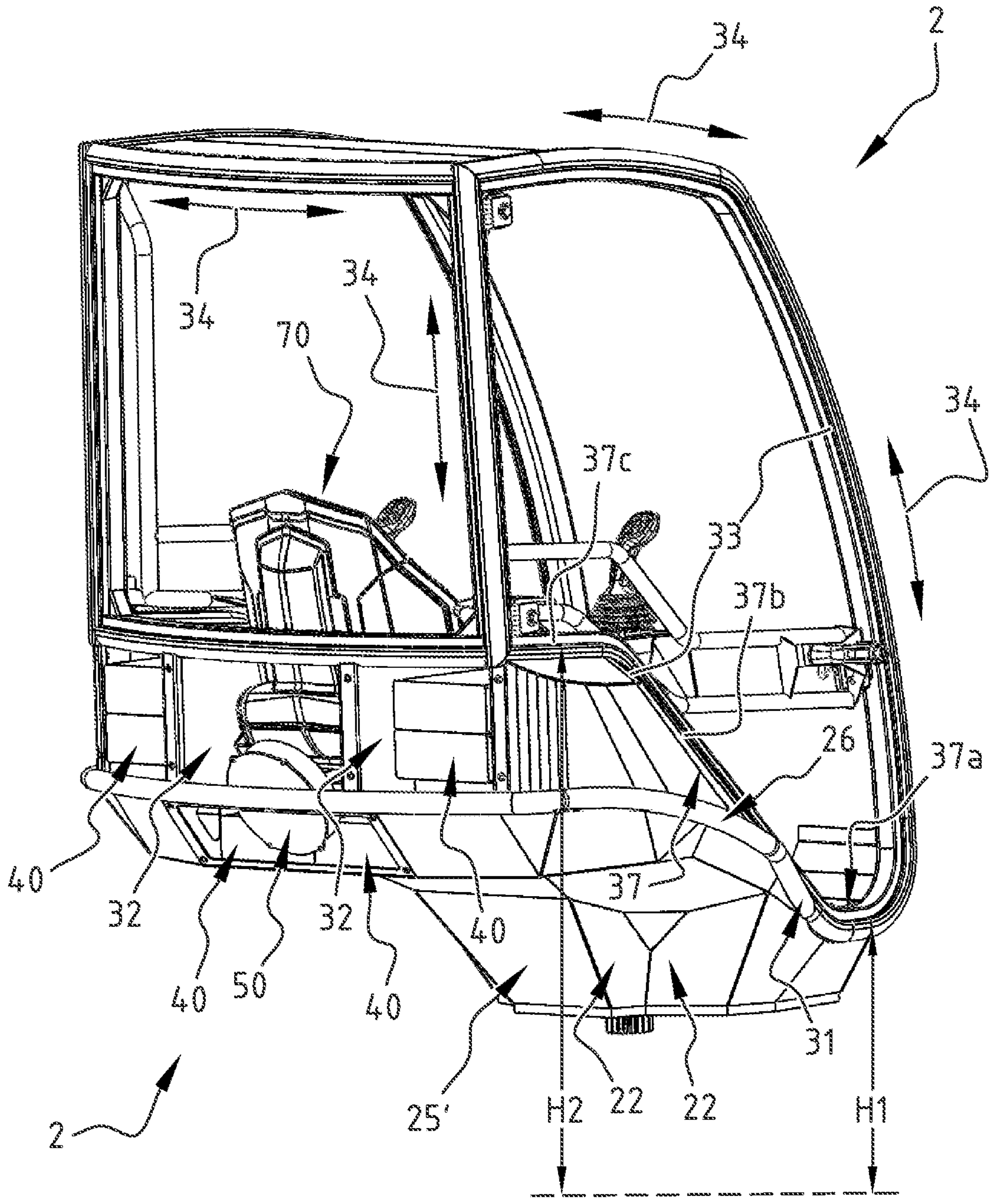
Figure 9:
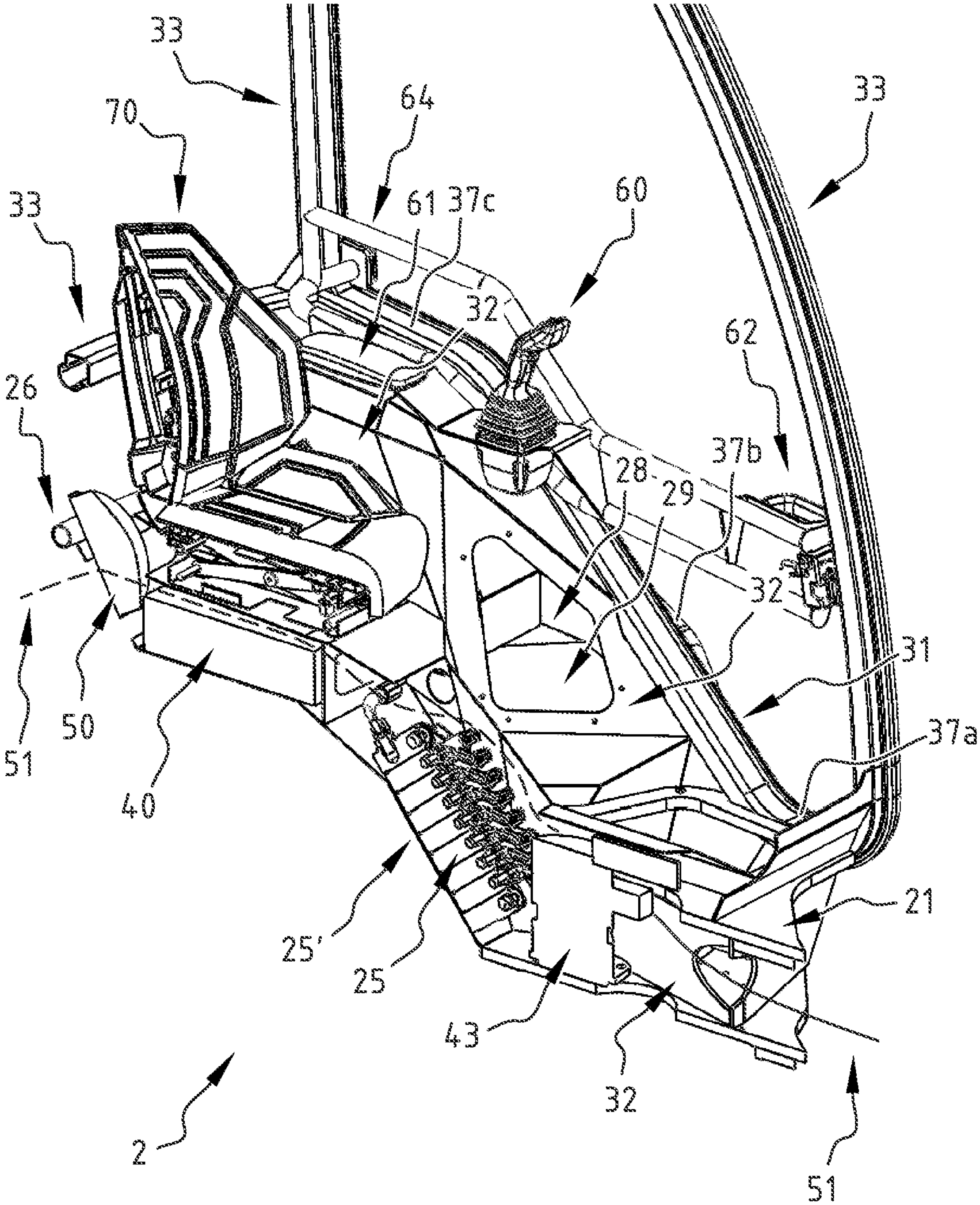
Figure 10:
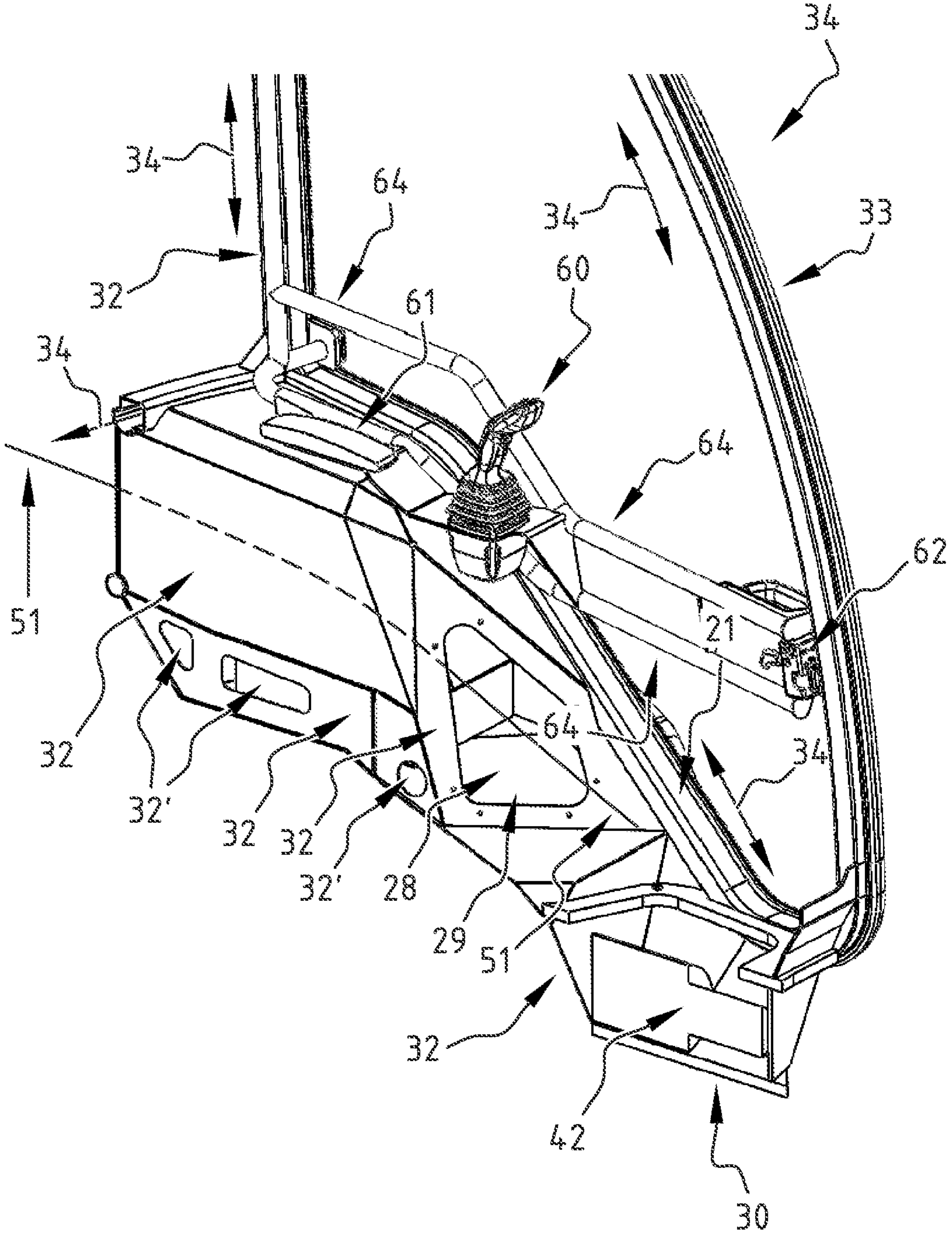
Figure 11A:
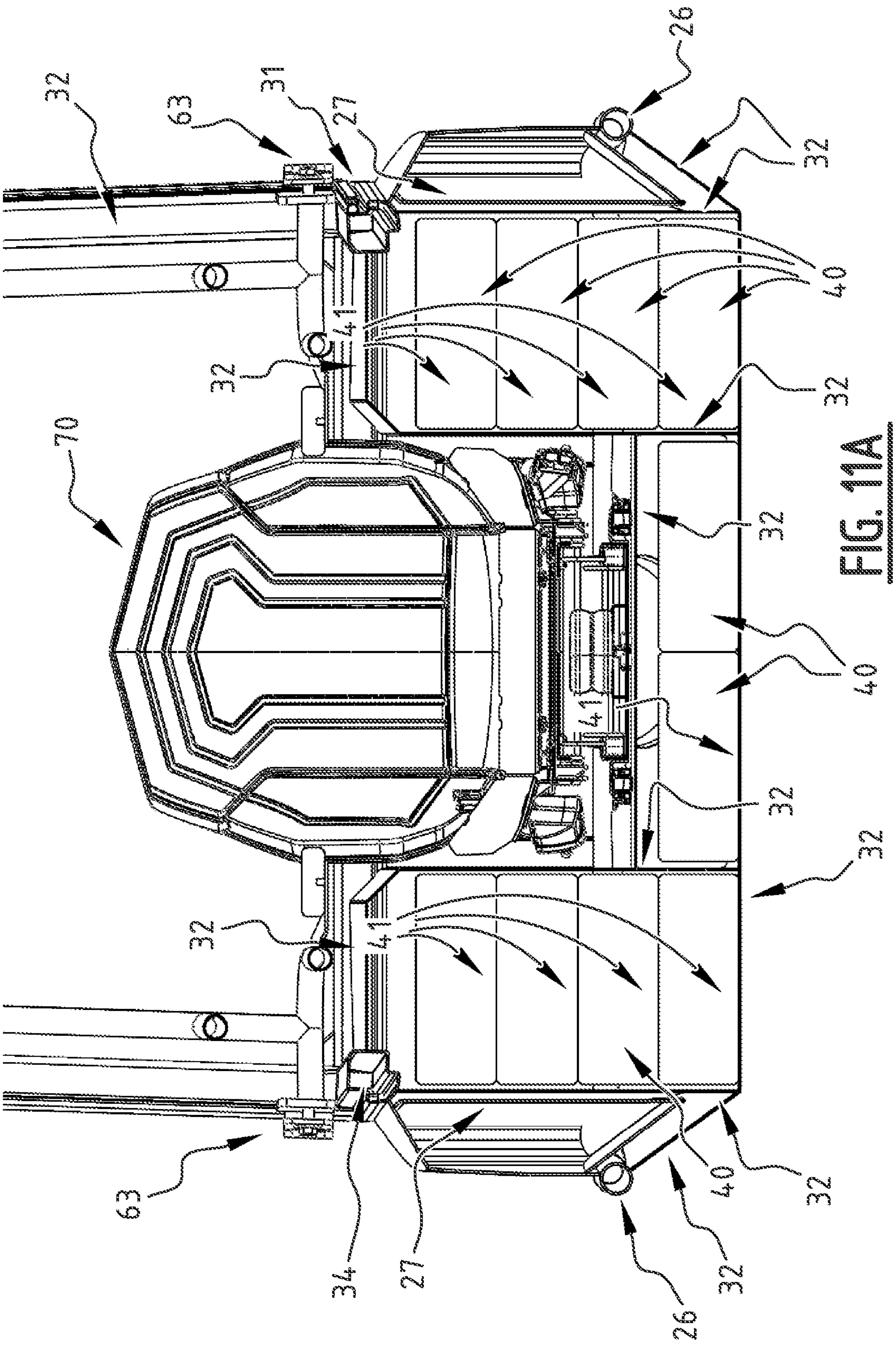
Figure 11D:
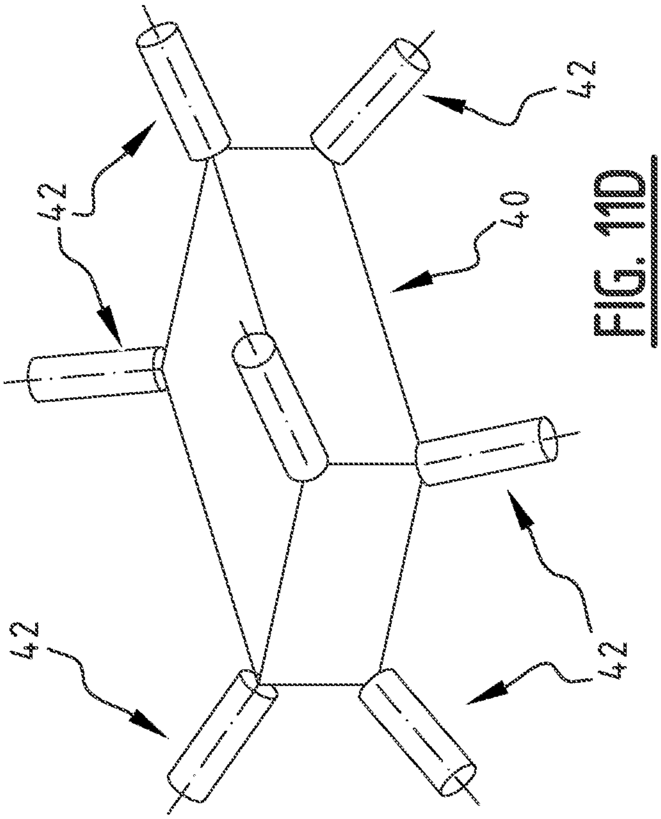
Figure 11B:
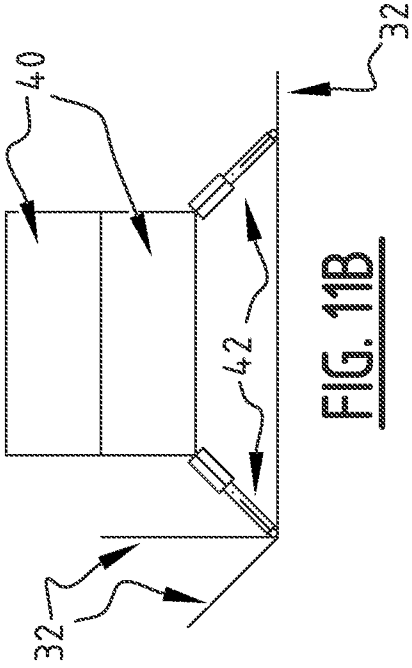
Figure 11C:
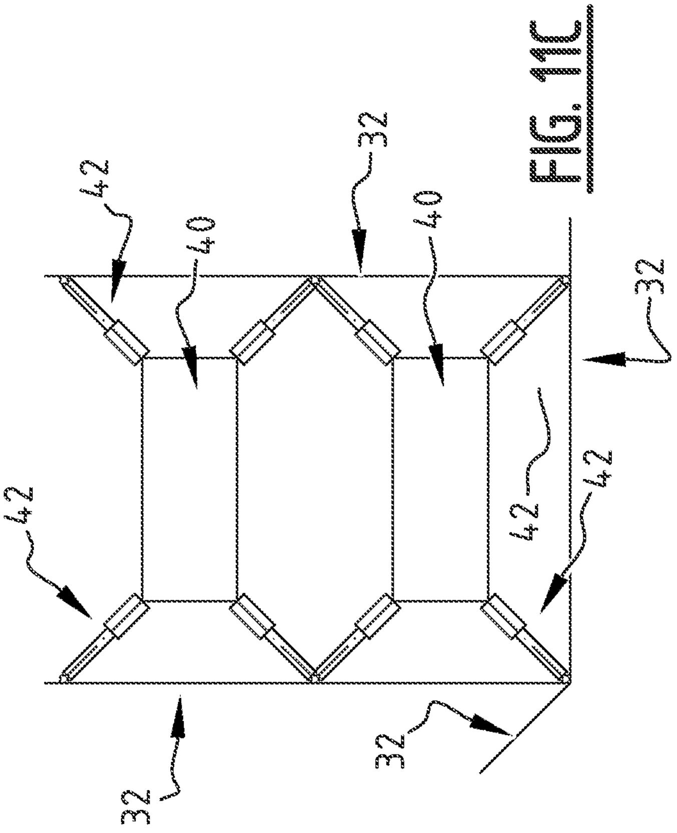
Figure 12:
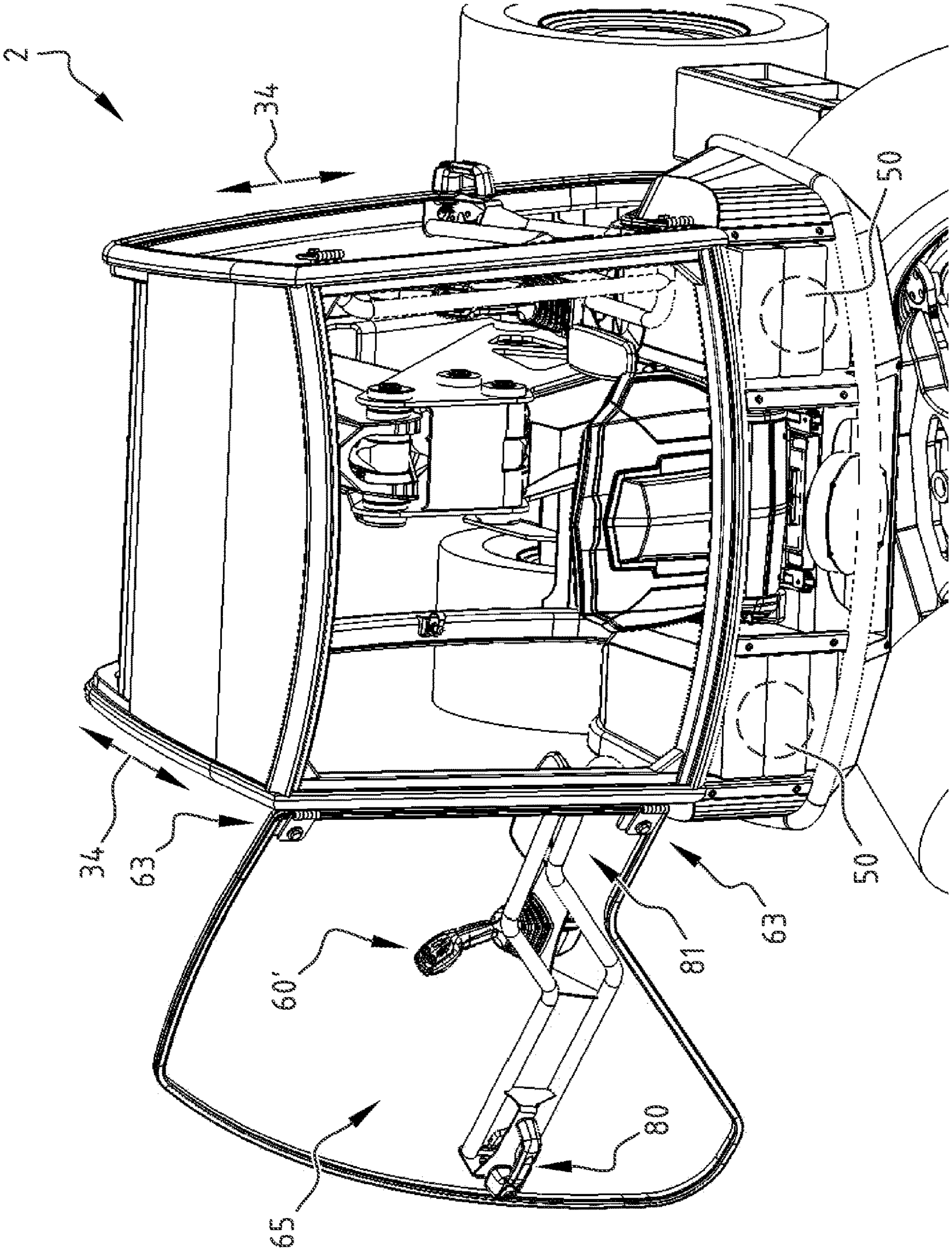
Figure 13:
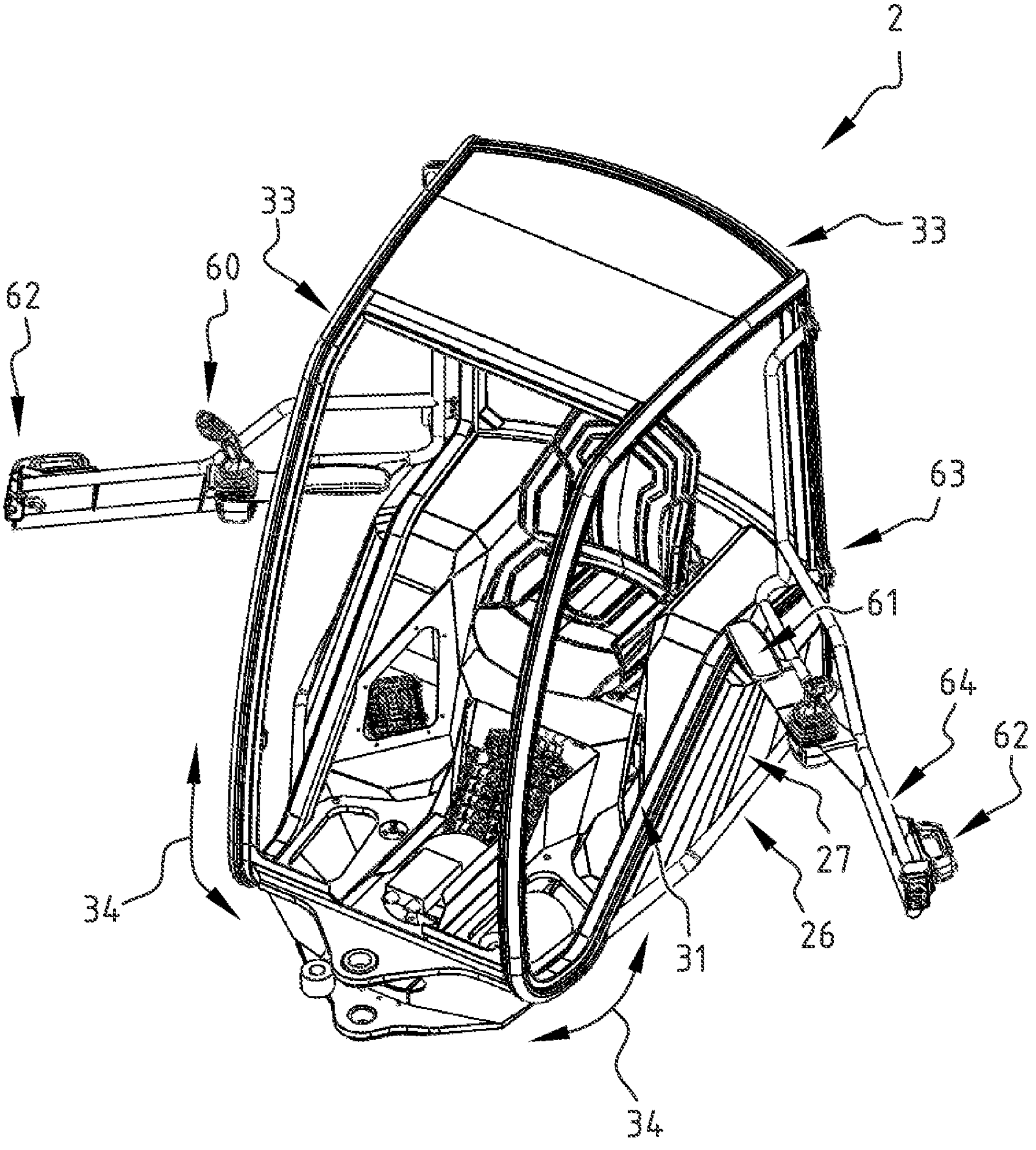
FIG. 13 illustrates the possibility for both a left and right side movable structure on which operating instruments like a joystick can be positioned.
Figure 14:
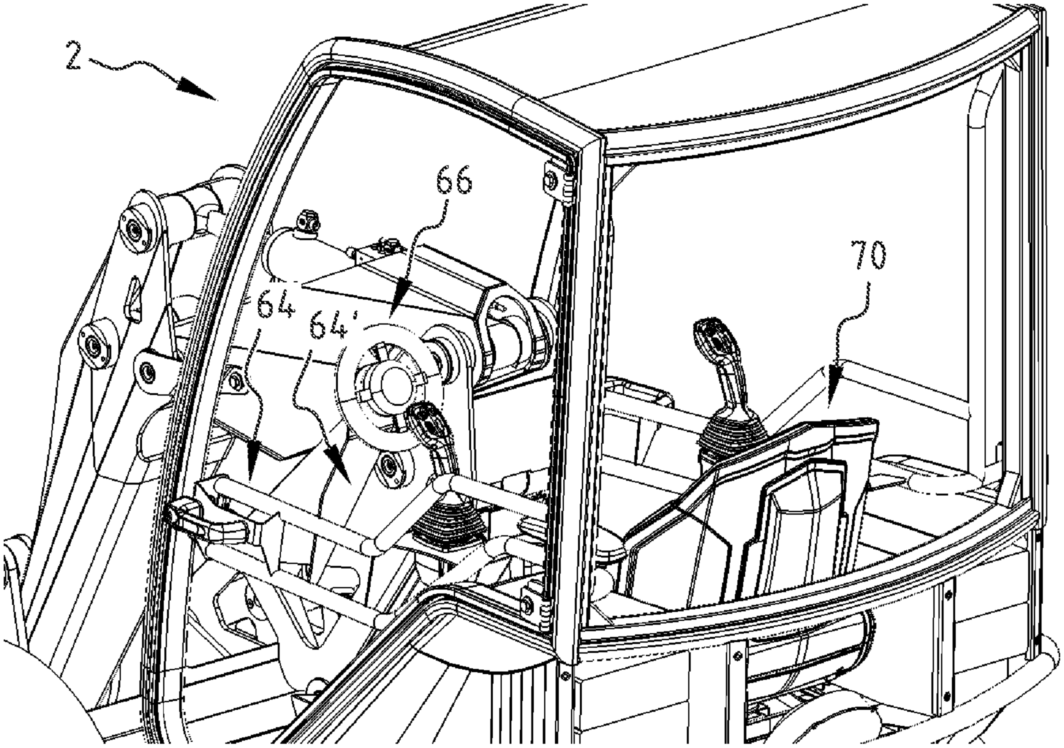
FIG. 14 shows a movable structure 64 with a connected extension 64' of the structure to hold a steering wheel, which is positioned left of the centre of the seating or standing position.
Figure 15:
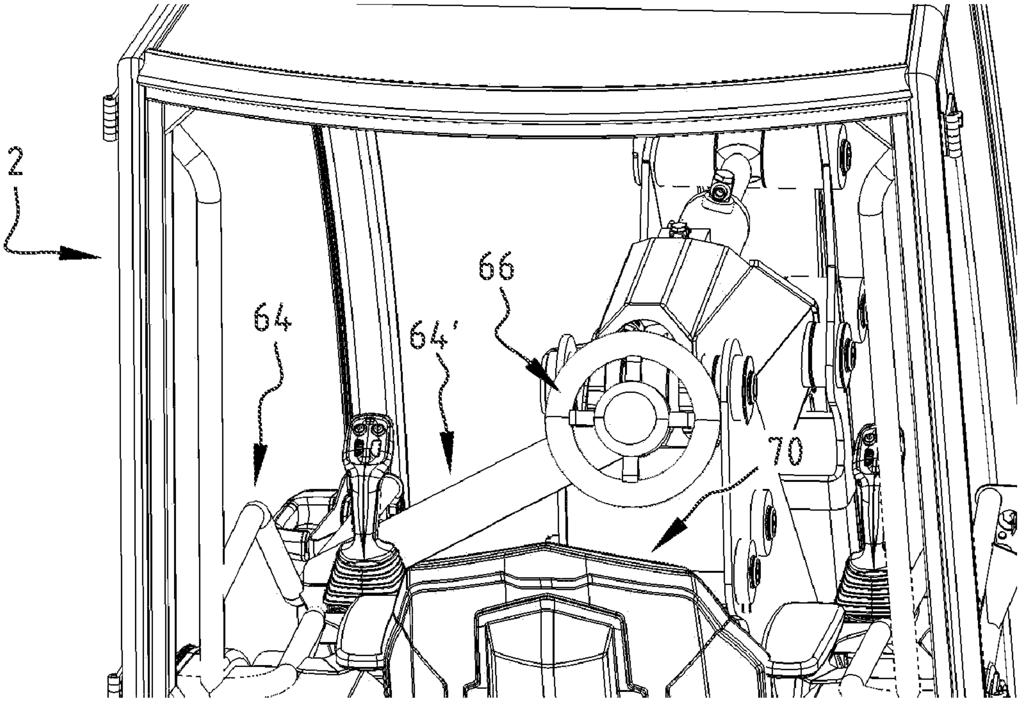
FIG. 15 depicts a similar extension 64' of a movable structure 64 on which a steering wheel is mounted. This steering wheel is shown here in the centreline of the seat.
Figure 16:
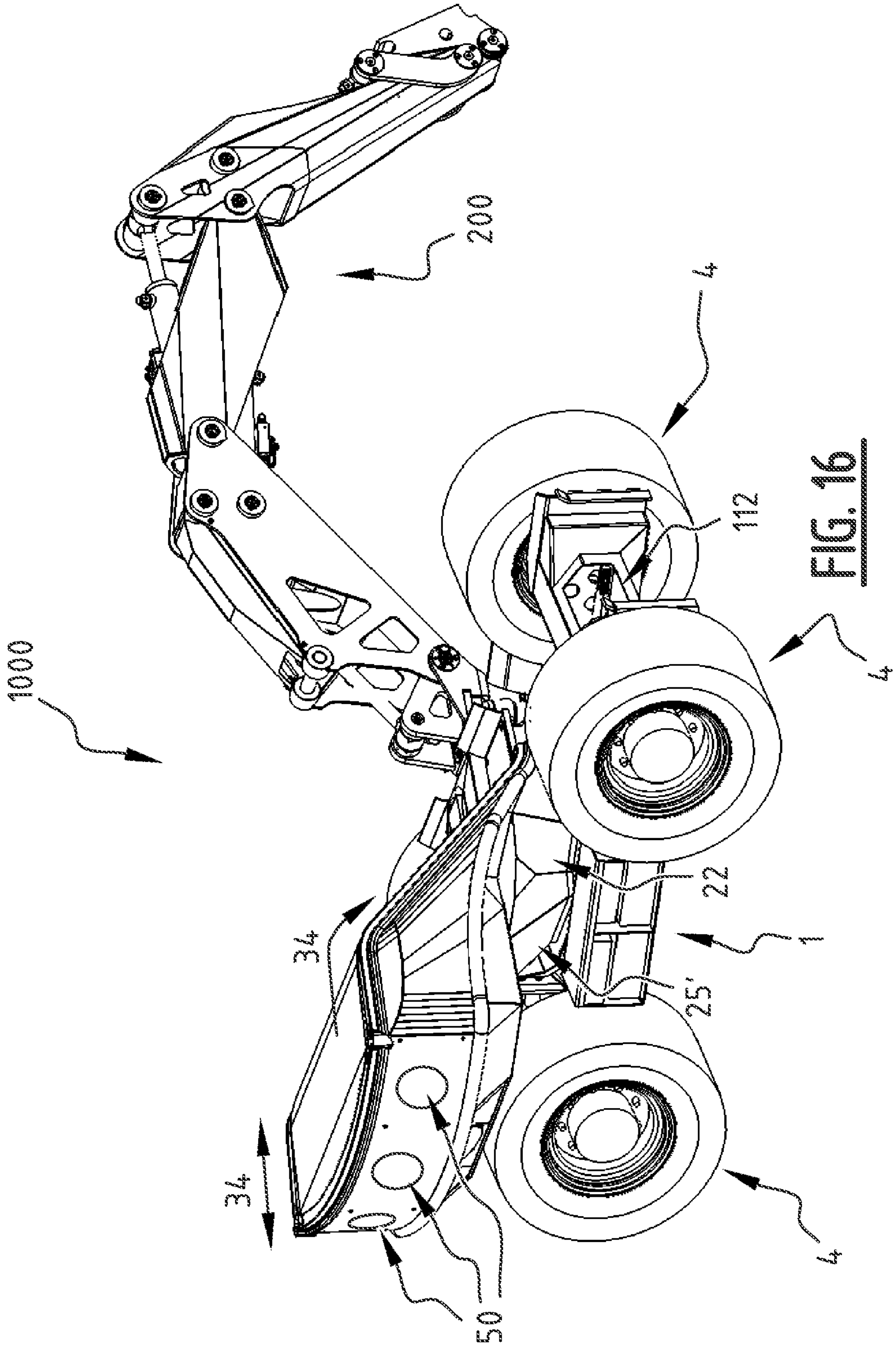
FIG. 16 shows an embodiment without a protective structure and seating position for an operator.
Figure 17:
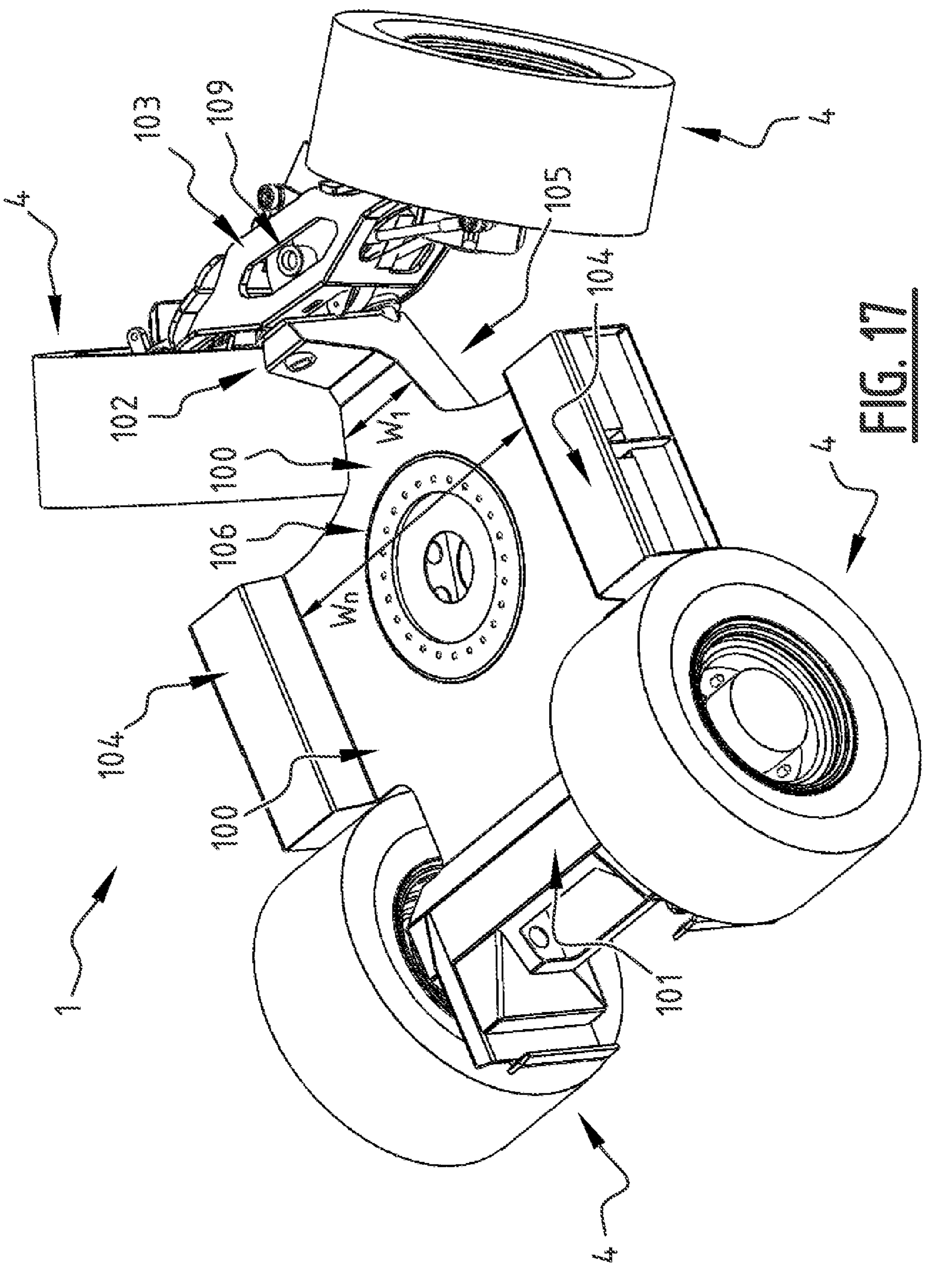

FIG. 17 gives an overview of a main frame with a lower central area 100, the higher directional areas 101 and 102 and the higher side areas 104. The movable structure 103 for oscillation or suspension is connected to the steerable displacement means 4. The narrow body structure 105 to allow sharp steering angles is visible. In the centre, the location for a possible slew bearing 106 can be seen.

Figure 18:
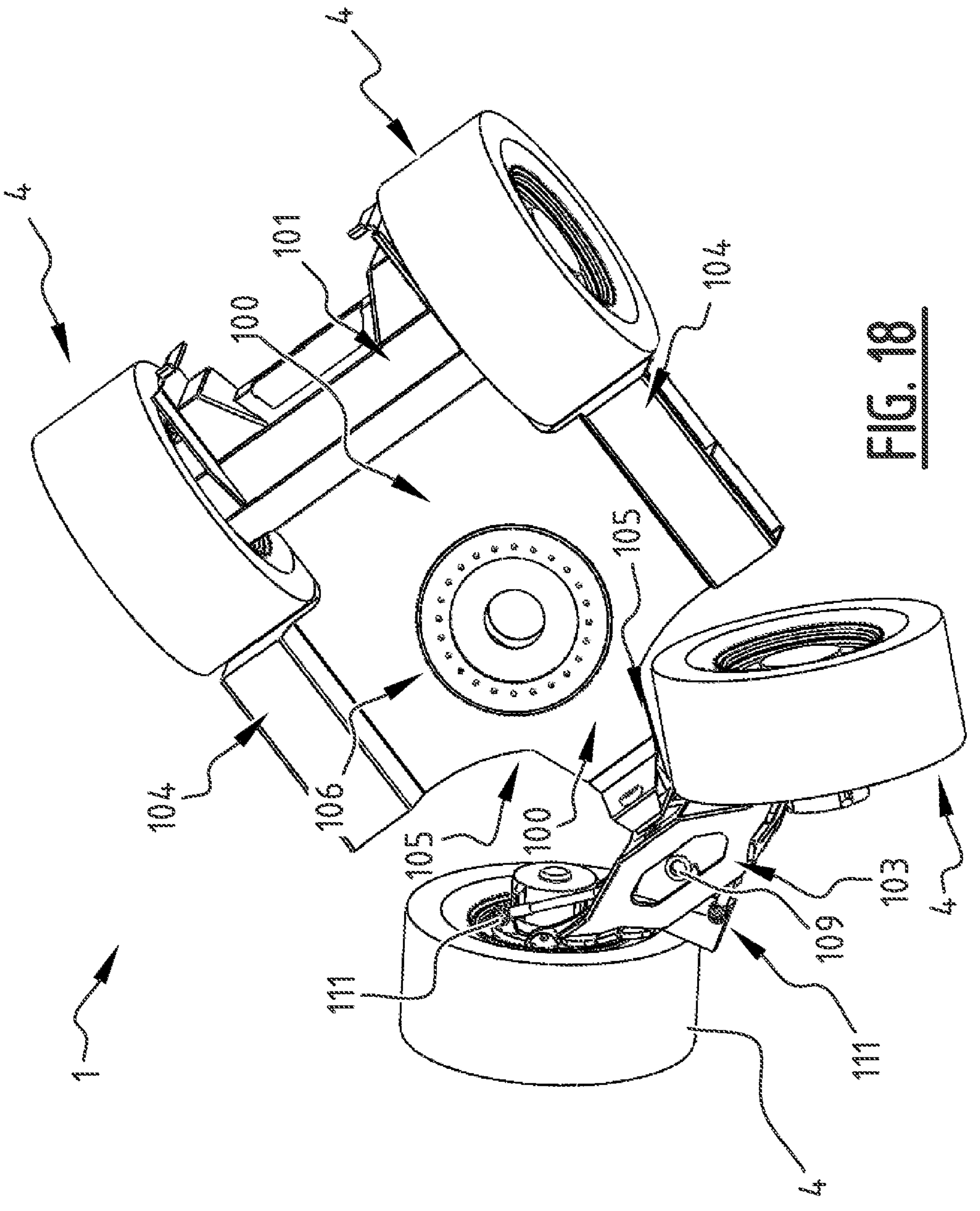

FIG. 18 with top view of a main frame 1 shows why the narrow body structure and recess 105 of frame 1 is necessary for the sharp steering angle of the displacement means 4. The mechanical structures such as tie-rod swivel points 111 for a sharp steering angle rotate here over centre rotation point 109.

Figure 19:
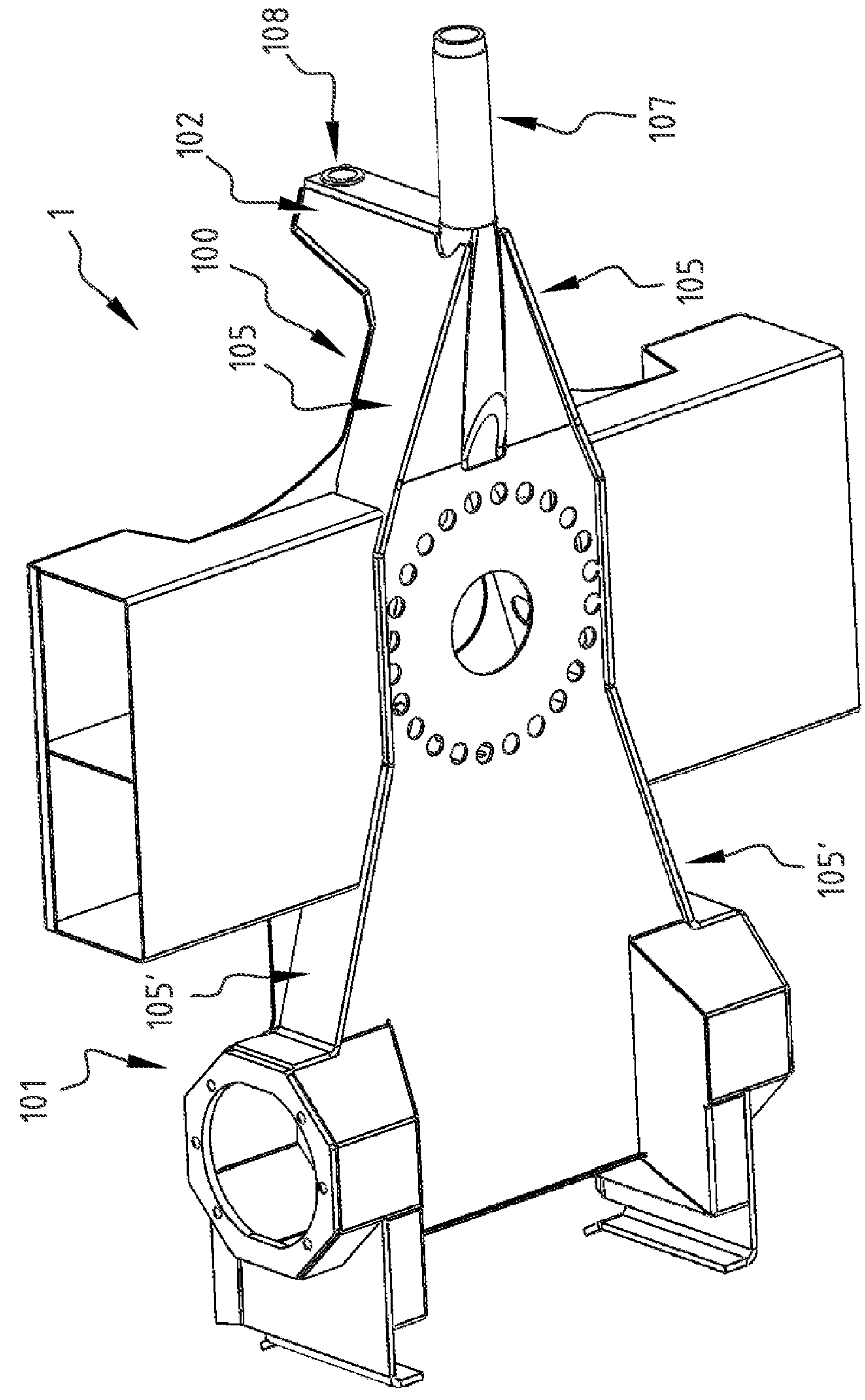

FIG. 19 provides a view of a main frame 1 with a swivel point 107 for the oscillation of a structure holding displacement means. It can be seen in this angle that the narrow body v-shaped body structure 105 actually runs throughout the length of a main frame to other side 105'. Also in this view a higher body part 102 can be seen, which holds a location 108 for blocking oscillation or suspension of displacement means through a structure.

Figure 20:
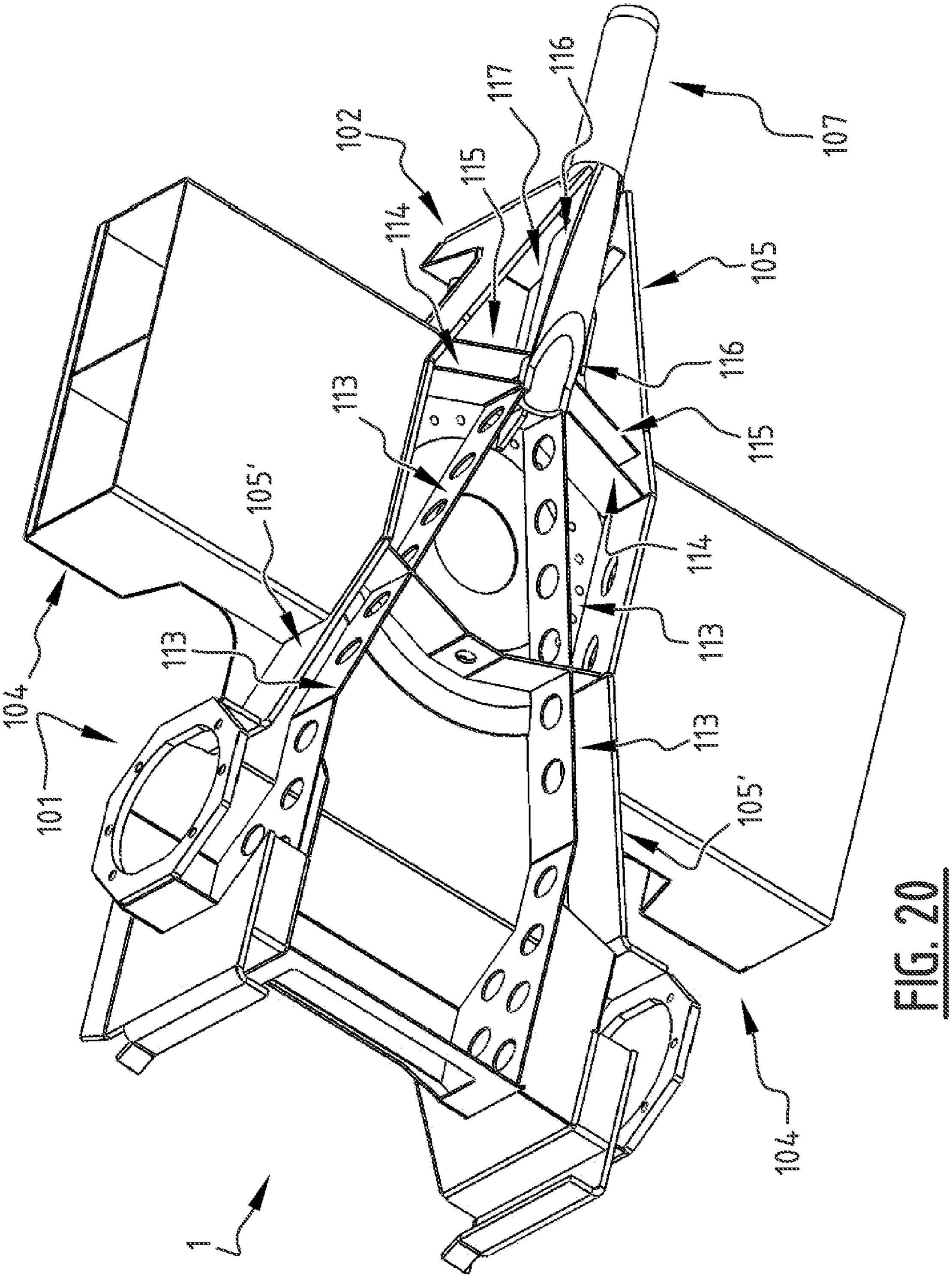

FIG. 20 provides a bottom view of the inside of a main frame 1 with internal longitudinal structural members or plates in a v-shape under the area 106 of a potential slew bearing. Cross sectional members or bulkheads 114, 115 and 117 are visible, as well as an attachment point 107 for a structure or suspension for displacement means, which continues in the frame pointed by locations 116.

Figure 21:
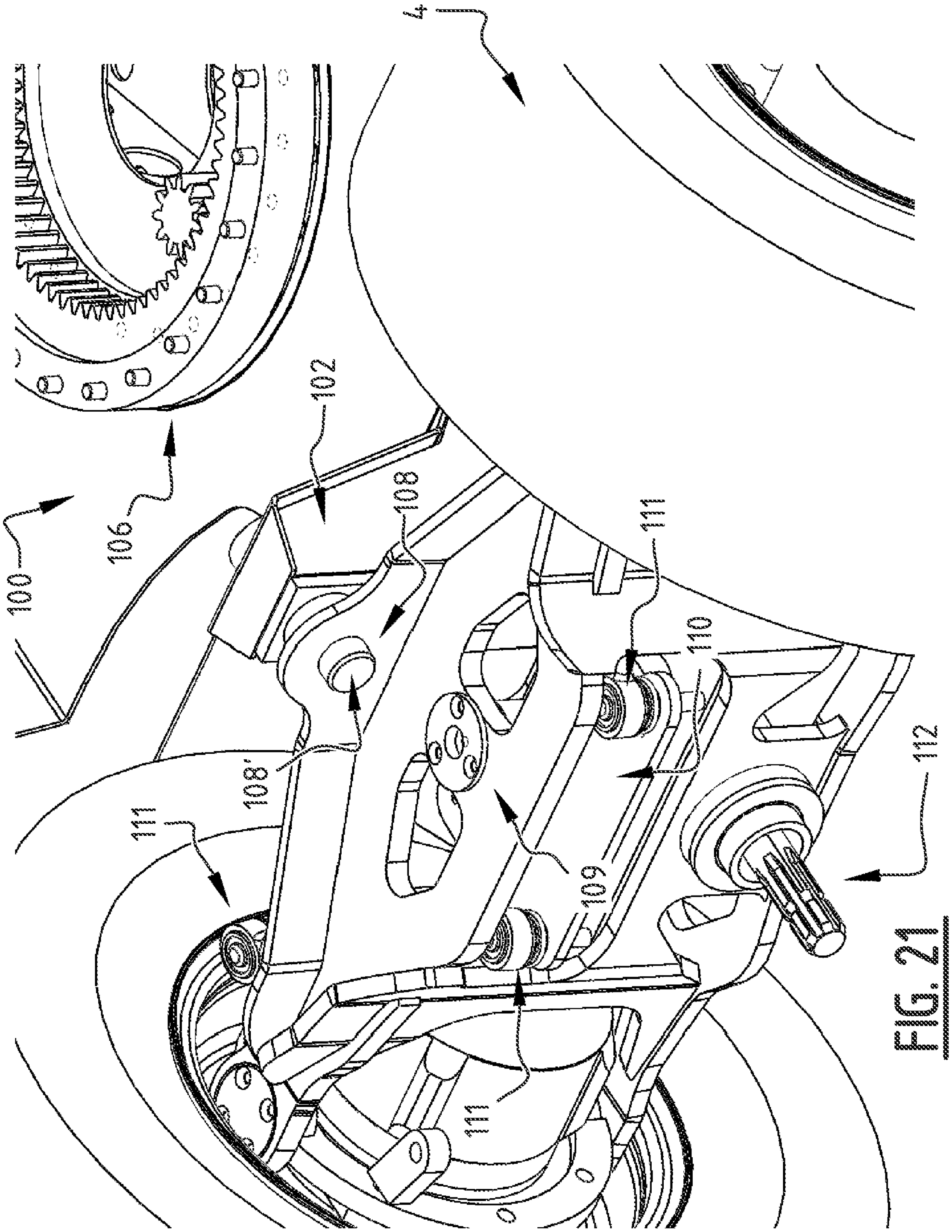

FIG. 21 illustrates displacement means 4 in a straight line, non-steered. The swivel points 111 for mechanical linkages or tie-rods are here in the neutral position. The connecting structure for these swivel points 110 can be rotated over point 109. The structure for displacing means is locked by means of a pin 108' in location 108 to the higher body structure of the main frame 102. Pin 112 for instance through the swivel point of the displacement means can be a rotating shaft or a towing location for an attachment or trailer.

Figure 22:
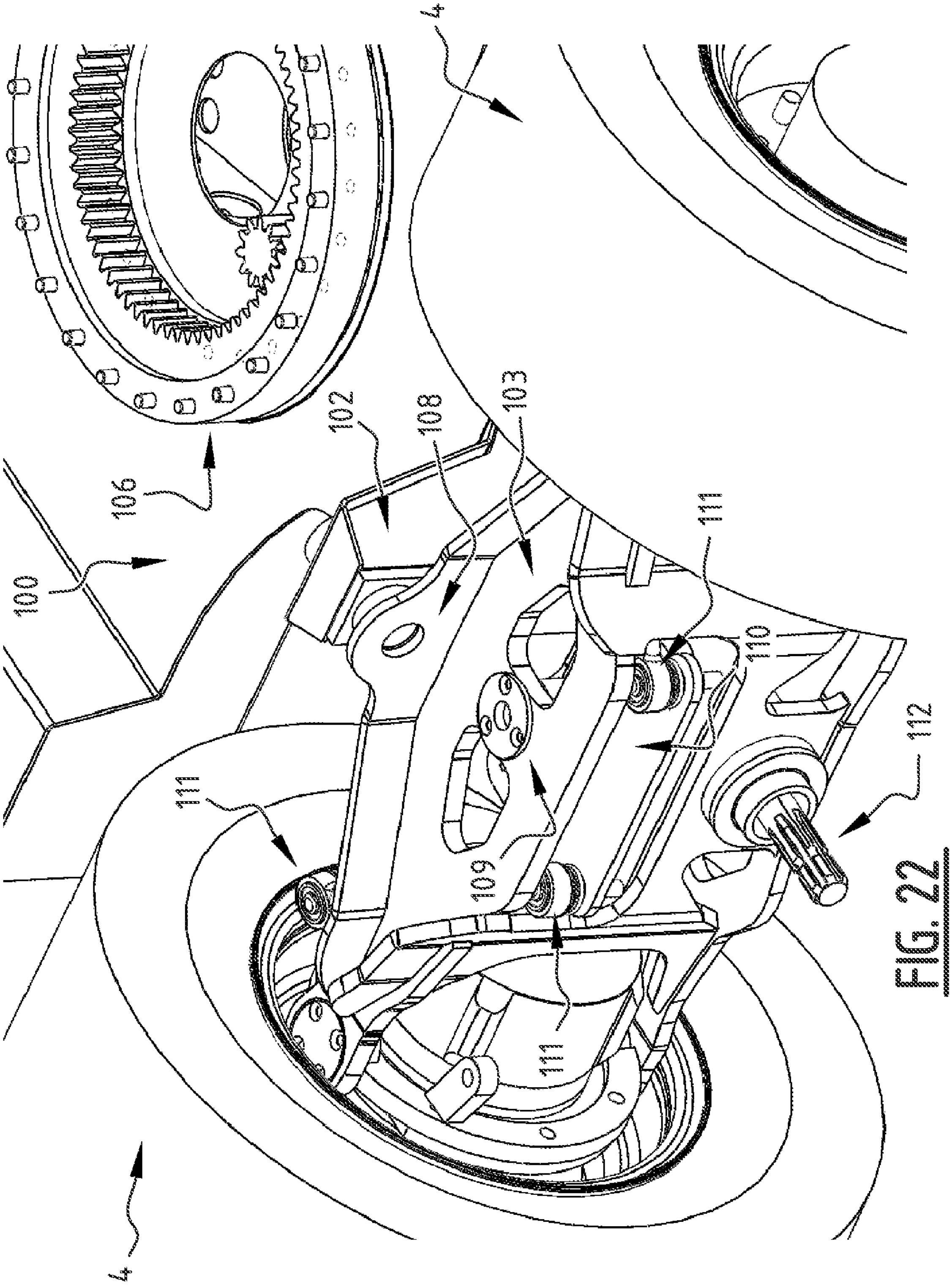

FIG. 22 is similar to FIG. 21 with the difference that the structure for the displacement wheels is not locked to the higher body structure 102 of the main frame.

The present invention is not limited to the shown embodiments but also extends to other embodiments falling within the scope of the appended description and claims.

The invention claimed is:

1. A mobile apparatus, comprising:

a main frame with displacing means, a rotating sub-frame rotatably connected to the main frame, such that the sub-frame is rotatable around a rotation axis relative to the main frame, and a working arm connected to the sub-frame, wherein the sub-frame is provided with a standing or seating position for an operator, said working arm comprising at least two arm segments, wherein a first arm segment of the at least two arm segments is pivotally connected to the sub-frame around a pivot point located at a distance in front of the rotation axis, and wherein the first arm segment and the sub-frame are configured such that the first arm segment can be moved rearwards onto the sub-frame in the direction of the rotation axis to a rearward position in which the first segment extends over the rotation axis, wherein the first arm segment is arranged centrally in front of the standing or seating position.

2. The mobile apparatus as claimed in claim 1, wherein the distance between the rotation axis and the pivot point is larger than 10 cm, and wherein the distance between an end point of the first arm segment and the rotation axis in the rearward position is larger than 10 cm.

3. The mobile apparatus as claimed in claim 1, wherein the sub-frame is provided with a support location for the legs and/or feet of the operator, said support location being located next to the first arm segment, seen in a top view of the sub-frame.

4. The mobile apparatus as claimed in claim 1, wherein the sub-frame is configured to be locked in a locking location to the first arm segment when the first arm segment is in the rearward position.

5. The mobile apparatus as claimed in claim 4, further comprising one or more operating instruments configured for controlling the engagement of the locking or unlocking and the movement of the first arm segment to and away from the rearward position.

6. The mobile apparatus as claimed in claim 1, wherein the displacing means are configured to rotate and sharply steer into two recesses in the lower rear part of the sub-frame.

7. The mobile apparatus as claimed in claim 1, wherein the sub-frame has an outer surface comprising two inwardly extending portions forming two recesses for allowing rotation of the displacing means relative to the sub-frame.

8. The mobile apparatus as claimed in claim 1, wherein the sub-frame comprises structural plane members dividing the sub-frame in compartments to house technical components.

9. The mobile apparatus as claimed in claim 8, wherein the compartments are arranged or configured to allow separate cooling and heating flows, either air or liquid.

10. The mobile apparatus as claimed in claim 8, further comprising an air filter arranged such that air can enter through openings in one or more compartments with the air filter.

11. The mobile apparatus as claimed in claim 1, wherein additional energy storage components are positioned on the rear left and/or rear right outside area of the sub-frame.

12. The mobile apparatus as claimed in claim 1, wherein a fluid tank is positioned on the rear left and/or rear right outside area of the sub-frame.

13. The mobile apparatus as claimed in claim 1, wherein the sub-frame comprises hollow structural profile members filled with a flowing fluid.

14. The mobile apparatus as claimed in claim 1, wherein the main frame comprises a middle section and a narrow section connected to the middle section and creating on either side a recess for allowing sharp steering angles of the displacement means, said narrow section having a width which is less than two third of the width of the middle section.

15. The mobile apparatus as claimed in claim 1, wherein the main frame comprises outer structural members running from one side to the other side in a v-shape.

16. The mobile apparatus as claimed in claim 1, wherein an oscillation or suspension of displacement means can be blocked.

17. The mobile apparatus as claimed in claim 1, wherein technical components or a hydrogen fuel cell module are suspended and/or dampened in a 2 or 3-directional movement.

18. The mobile apparatus as claimed in claim 1, further comprising a blade connectable to the main frame, said blade comprising at least one or more side stabilizers and actuators.

* * * * *